United States Patent [19]

Carden et al.

[11] Patent Number: 4,526,064
[45] Date of Patent: Jul. 2, 1985

[54] MOTION TRANSMITTING DEVICES

[75] Inventors: John C. Carden; Panayotis C. Dimitracopoulos, both of Nassau, The Bahamas; George D. M. Arnold, Jersey, Channel Islands

[73] Assignee: Quadrant Drive B.V., Leersum, Netherlands

[21] Appl. No.: 573,998

[22] Filed: Jan. 26, 1984

Related U.S. Application Data

[63] Continuation of Ser. No. 238,781, Feb. 27, 1981 abandoned.

[30] Foreign Application Priority Data

Apr. 2, 1980 [GB] United Kingdom ............... 8011061

[51] Int. Cl.$^3$ .................... F16H 1/28; F16H 13/06
[52] U.S. Cl. ...................... 74/804; 74/805; 74/798
[58] Field of Search ............... 74/804, 805, 462, 457, 74/802, 798

[56] References Cited

U.S. PATENT DOCUMENTS

| 2,520,282 | 8/1950 | Henry | 74/804 |
| 2,750,807 | 6/1956 | Miyazaki | 74/457 |
| 3,037,400 | 6/1962 | Sundt | 74/804 |
| 4,023,440 | 5/1977 | Kennington et al. | 74/805 X |
| 4,106,361 | 8/1978 | Burtis | 74/802 |
| 4,194,415 | 3/1980 | Kennington et al. | 74/805 |
| 4,449,425 | 5/1984 | Carden | 74/805 X |

FOREIGN PATENT DOCUMENTS

| 0014784 | 3/1980 | European Pat. Off. |
| 574504 | 4/1933 | Fed. Rep. of Germany |
| 1349898 | 7/1962 | France |
| 2278022 | 5/1975 | France |
| 2081037 | 11/1975 | France |
| 562722 | 7/1944 | United Kingdom |
| 578164 | 6/1946 | United Kingdom |
| 1585969 | 3/1981 | United Kingdom |

OTHER PUBLICATIONS

Publication 814, PT Werktuigbouw Jrg. 33, No. 9, (1978.09).

Primary Examiner—Allan D. Herrmann
Assistant Examiner—Stephen B. Andrews
Attorney, Agent, or Firm—Beveridge, DeGrandi & Weilacher

[57] ABSTRACT

A motion transmitting device incorporates a toothed wheel wherein each recess between any two consecutive teeth is a portion of an ovoid profile.

The ovoid profiles of such toothed wheel interengaging with a series of ovoid holes formed on a datum plate indirectly through interconnecting meshing elements, thus providing motion-transmitting devices which may have multitooth engagement and thereby multitooth transmission of loads.

81 Claims, 28 Drawing Figures

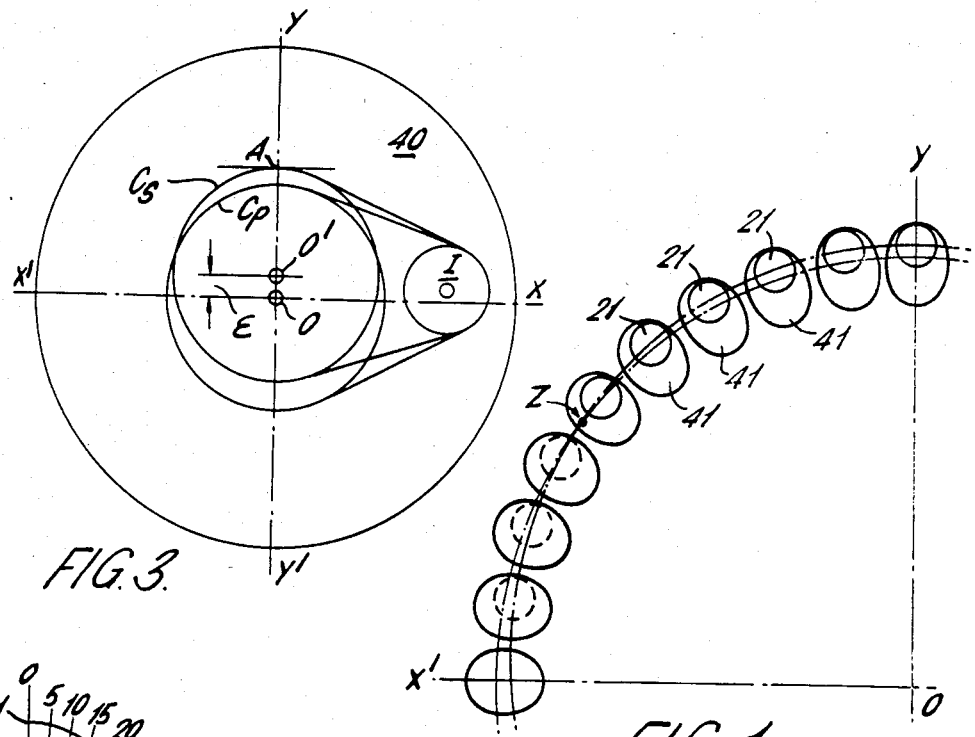
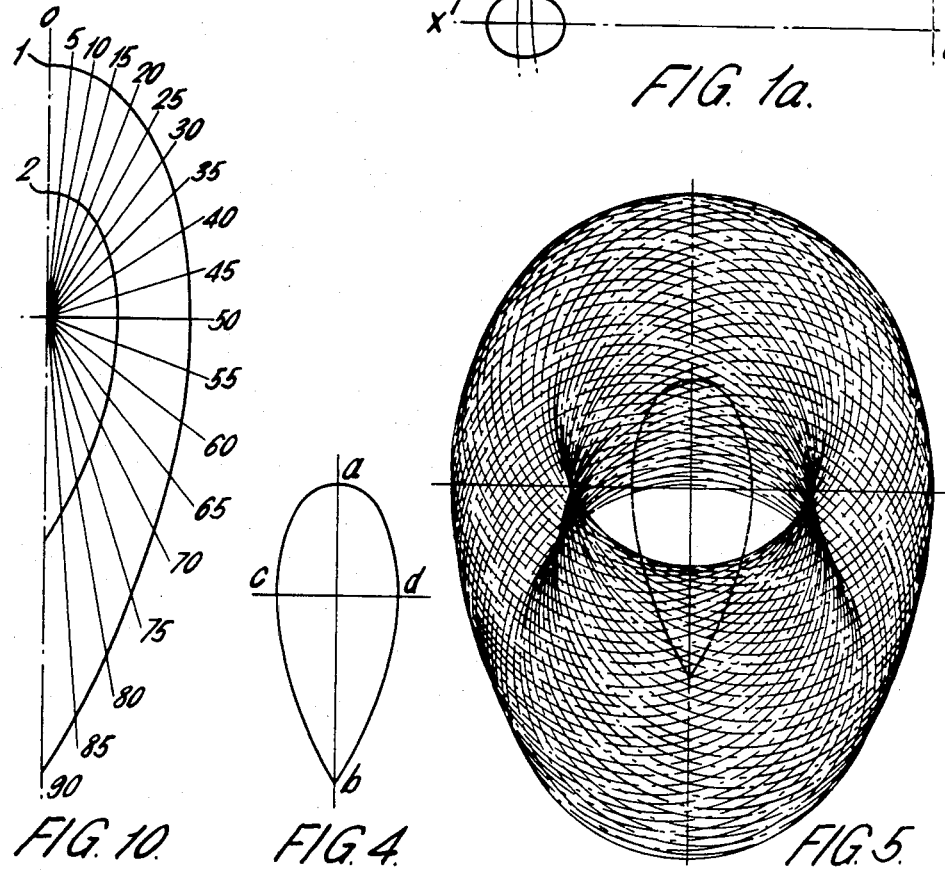
FIG. 3.  FIG. 1a.  FIG. 10.  FIG. 4.  FIG. 5.

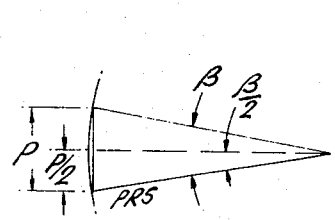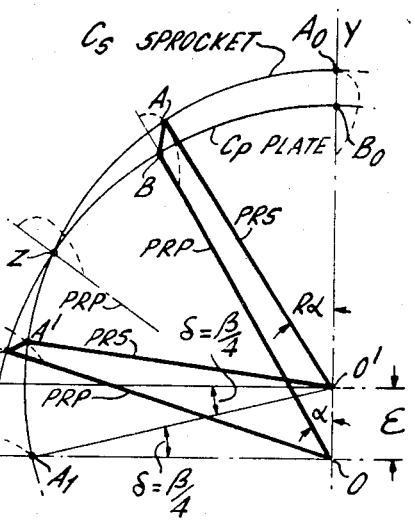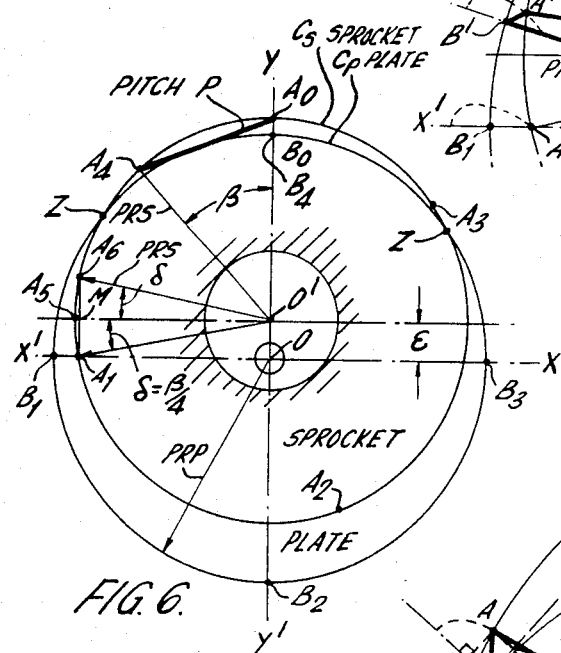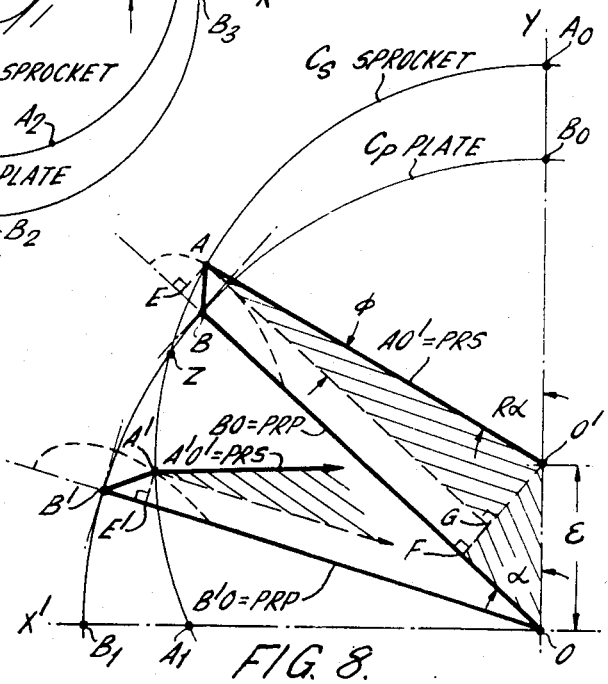

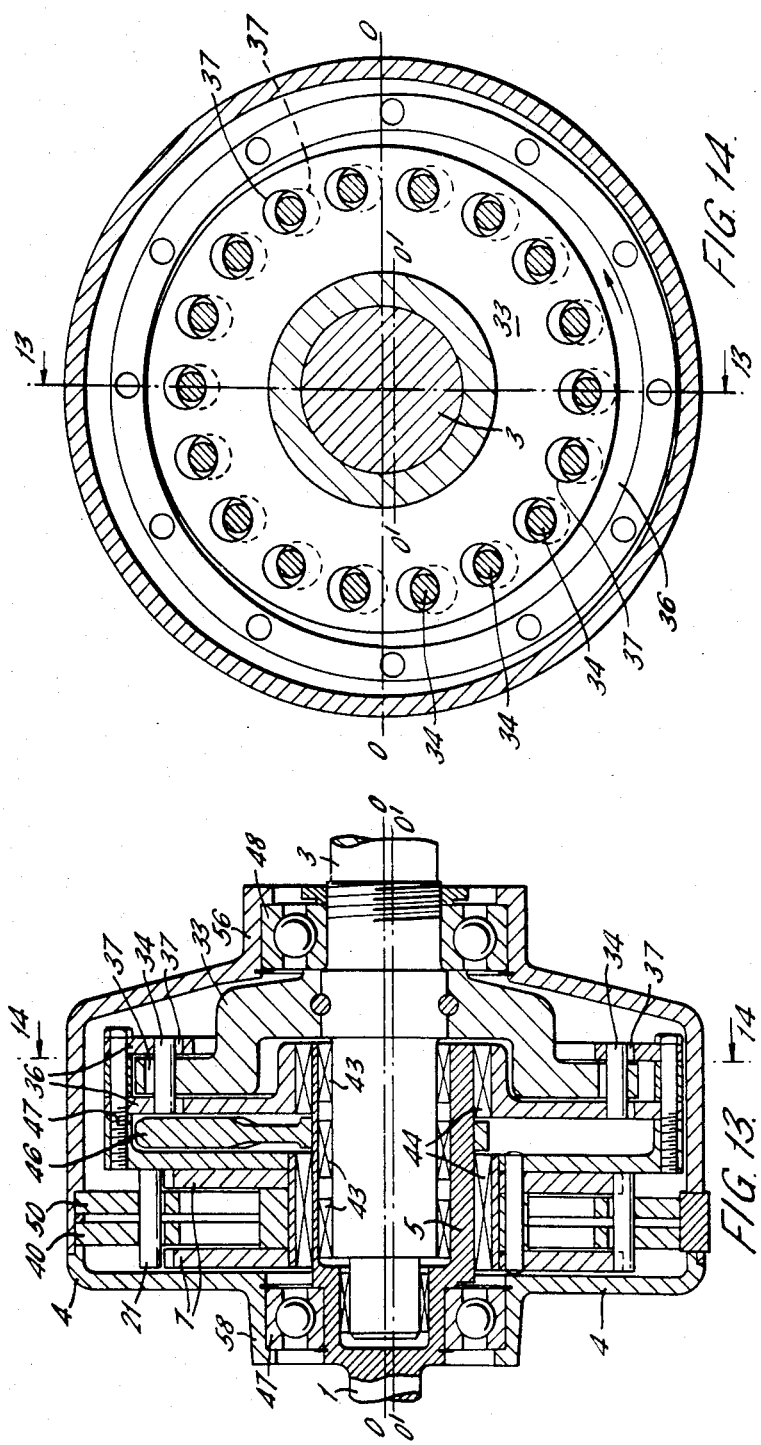

MOTION TRANSMITTING DEVICES

This is a continuation of application Ser. No. 238,781, filed Feb. 27, 1981, now abandoned.

PRIORITY

The invention disclosed herein claims priority of British Patent Application No. 8011061 dated Apr. 2, 1980 for "Motion Transmitting Devices".

FIELD OF INVENTION

This invention generally relates to rotary motion transmitting devices and more particularly to torque converters and speed changing devices.

Furthermore, it relates to a novel Engineering Principle pertaining to the abovementioned devices, co-invented by one of the inventors of the instant invention and disclosed in U.S. Pat. No. 4,023,440 dated May 17, 1977 and No. 4,194,415 dated Mar. 25, 1980. Such Engineering Principle was named the QUADRANT DRIVE.

DESCRIPTION OF THE PRIOR ART

Almost all prime movers, motors and the like, provide rotational output speeds which are higher, or much higher, than the required input speeds of the mechanisms they power.

Therefore, speed changers, that is gearing arrangements, are almost universally employed in each and every machine and mechanical device. However, in conventional gearing engagement is provided between a group only of adjoining teeth, usually only one tooth. This enormous waste is taken for granted but it must be remembered that each and every gear-tooth, idly and wastefully rotates most of the time, until its turn arrives to momentarily carry the entire load. Evidently, the larger the speed ratio, the larger the number of idly turning teeth and the larger the waste.

The immense significance of the QUADRANT DRIVE principle is that it makes possible:

"Multitooth engagement and multitooth transmission of loads."

THE PRESENT INVENTION

The present invention is a considerable advancement in the theory and art of motion-transmitting devices because:

It introduces the concept of "Multiprofile Engagement".

Develops the analytical methods for the experimental and theoretical determination of the shapes and sizes of such "Profiles", capable of "Multiprofile Engagement".

Develops the analysis that determines the actual number of engaging profiles (over their total number).

Furthermore, the present invention is concerned with:

A toothed wheel having between consecutive teeth specially shaped recesses, making possible multitooth engagement.

Novel motion-transmitting devices, such as torque converters and speed changing mechanisms, which incorporate the abovementioned toothed wheel, thus making possible multitooth engagement, substantially increased efficiency, great simplicity and reduced size, weight and cost.

BRIEF DESCRIPTION OF THE FIGURES

The invention may be reduced to practice in many ways and, therefore, preferred embodiments thereof will now be described by way of example, reference being made to the accompanying drawings, in which:

FIG. 1a is a diagram illustrating the relative positions of a meshing connector element while engaging a "profile" of the invention, during an engaging quadrant.

FIG. 3 is a simple set-up employed for the experimental determination of an Ovoid Profile according to the invention.

FIG. 4 is a typical Ovoid Profile, such as traced by the set-up of FIG. 3.

FIG. 5 illustrates a typical graphical determination of an Ovoid Profile capable of accomodating a meshing element (pin) of a given diameter.

FIGS. 6, 7 and 8 are diagrams to which reference is made in the description.

FIG. 9 is a geometric diagram to which reference is made in the description.

FIG. 10 is a typical diagram derived from the (theoretical) mathematical determination of an Ovoid Profile according to the invention.

FIG. 13 is a cross-section, taken along line 13—13 of FIG. 14, of a two stage device according to the invention, in which the second stage is a novel planocentric device.

FIG. 14 is a cross-section taken along line 14—14 of FIG. 13.

DESCRIPTION OF A SIMPLE EMBODIMENT

Figure 1:
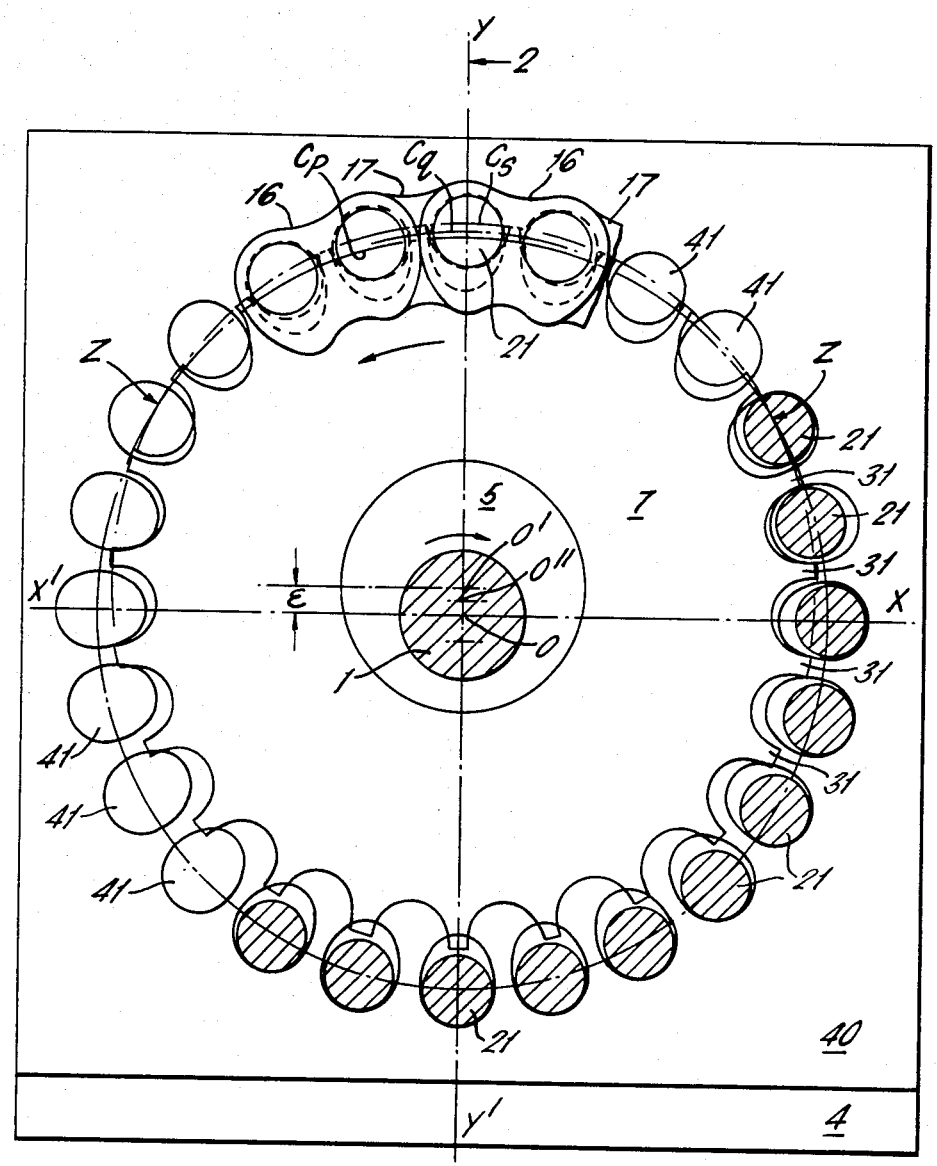
FIG. 1 is a front elevation of a simple embodiment of the invention with some parts broken away, or removed, and some parts assumed to be built of transparent material, in order to facilitate the description.
Figure 2:
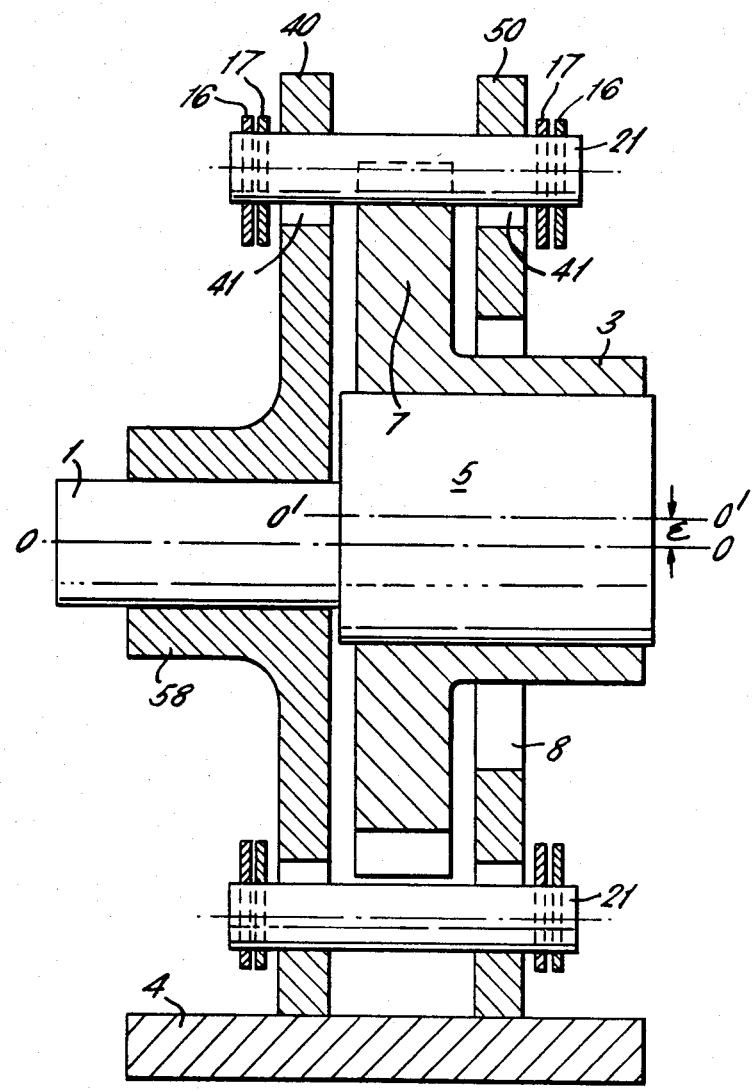
FIG. 2 is a cross-sectional elevation of the FIG. 1 taken along line 2—2.

FIGS. 1 and 2 illustrate a simple embodiment of the invention with some parts removed, or broken away, to facilitate the ensuing description. In order to further facilitate the description, the datum plate 40 and its input-supporting hub 58 (FIG. 2) are assumed to be constructed of a transparent material, so that the sprocket 7 and the eccentric 5 may be clearly seen through them in FIG. 1.

The motion-transmitting device of FIGS. 1 and 2 has a base frame 4 which is fixedly supporting two essentially similar datum plates 40 and 50. Datum plate 40 is formed with an internal hub, or collar, 58 within which is journalled for free rotation the input shaft 1, having a longitudinal axis O—O. Fixedly and eccentrically secured to this input shaft 1 is a cylindrical eccentric 5, having a longitudinal axis O'—O', the eccentricity being the distance O—O'=ε. A toothed wheel, or sprocket, 7 is journalled for free rotation about this eccentric 5. The toothed wheel 7 is formed at its periphery with a number of equidistantly disposed teeth 31, while the recesses between consecutive teeth are of novel design, constituting an important feature of the present invention. Thus, these recesses have specially designed profiles which are portions of Ovoid Loci, derived from spacial formulae to be described in considerable detail later.

The datum plates 40 and 50 have a series of specially shaped holes 41, all such holes 41 being equidistantly and radially disposed about centre O and also equidistantly arranged from one another. All such holes 41 have a specially designed "Ovoid Profile".

There is at least one more hole 41 than there are teeth 31 and the holes 41 on the two datum plates 40 and 50 are facing one another so that each such pair of holes 41 may hold captive a pin 21, as clearly shown in FIG. 2. The diameter of each of these pins is such that it can freely move within the contours of the pair of the ovoid holes 41 within which it is held captive.

Furthermore, the diameter of these pins 21, the shape and size of the ovoid holes 41 and the ovoid profiles constituting the recesses between the teeth of the sprocket 7, are carefully designed and calculated so that these pins 21 may function as interconnecting meshing elements (connector meshing elements) between the ovoid holes 41 on the Datum Plates and recess after recess of the toothed wheel 7, with which they successively engage. In other words, each pin 21 is held fully captive within a pair of ovoid holes 41 (on the datum plates 40 and 50), while it also interengages recess after recess of the toothed wheel 7. But this engagement is also unique from another point of view, in that each pin 21 interengages the datum plates 40 and 50 (reaction elements) and the toothed wheel 7 (action element) by continuously moving within the contours of the profiles of the pair of ovoid holes 41 and also continuously moving within the ovoid profile of each recess of the toothed wheel 7.

As it will be mentioned later, this motion may be, under specific conditions, a pure rolling motion, and when this condition is achieved, the friction losses are reduced to almost zero (theoretically they are actually reduced to zero). And, as it has been emphasized several times, we may also have multitooth engagement and multitooth transmission of loads.

The meshing elements such as the pins 21 may be fully independent from one another or, alternatively, they may be interconnected through any convenient means, for example by means of side plates 16 and 17, as shown in FIGS. 1 and 2. By so doing, the pins 21 are kept apart from one another at desired, fixed, distances, which has the added advantage that it ensures that the pins will be kept away from the tips of the teeth during the disengaging two quadrants(i.e. below the axis X'—X of FIG. 1). However, as it will be seen later, other means may equally well be employed to ensure that the pins will freely pass over the teeth in the disengaging two quadrants and, therefore, the interconnection of the pins 21 through side plates 16 and 17, or any other interconnecting means, is fully optional.

In order to better illustrate some specific parts of the mechanism in FIG. 1, some pins 21 and most side plates 16 and 17 have not been shown. And again, for emphasis and purely for illustrative purposes, some pins 21 are shown cross-hatched.

Since, as abovementioned, there is at least one more ovoid hole 41 than there are teeth on the sprocket 7, there is also at least one more pin 21 than teeth 31 and, therefore, while these pins 21 engage above the diametric axis X'—X, they progressively disengage below it.

Sprocket 7 may be formed with an integral hub 3, which becomes the output shaft of the device. This output shaft 3 rotates eccentrically at a reduced speed. In most cases, it is desirable to restore such eccentric rotation to a pure rotation, preferably coaxial to that of the input shaft 1, and this may be accomplished through several means well known in the art.

The speed reduction of the device may be quite high, and is given by the formula:

$$n_s/(n_p - n_s)$$

where:
$n_s$ = number of teeth on the sprocket
$n_p$ = number of ovoid holes

From the above formula it can be seen that for maximum speed reduction $n_p - n_s = 1$, i.e. when there is one more ovoid hole than gear-teeth.

FIG. 1a is a diagram in which the number of Ovoids per quarter cycle have been increased to 9 (from 6 in FIG. 1) in order to better illustrate the successive positions that a meshing connector element (pin 21) takes, within an Ovoid Hole 41, during an engaging quarter cycle. For emphasis, the diameter of this pin 21 is shown smaller than its optimum size something that—unfortunately—distorts somewhat the actual facts. The pin is shown in dotted lines in its successive positions from point Z towards the X'—O axis, because in practice, from this point on, the resultant of the forces from the Datum Plate and the Sprocket (acting on the pin), is radially explosive (radially outwards) and, therefore, the pin will be normally pushed out of engagement (unless other means are employed to ensure a continuing engagement). It must be noted that from the position the pin occupies on the Y axis to the point Z, the resultant of the same forces is implosive (radially inwards), which ensures continuing engagement without any assistance from other means.

As it will be described in considerable detail later, point Z is the intersection of the pitch circles of the Ovoids on the Datum Plate and on the Sprocket.

The operation of the device is as follows (see FIGS. 1 and 2): As input shaft rotates, the eccentric 5, which is fixedly secured to it, forces sprocket 7 to gyrate (eccentrically move) in the same direction and to rotate in the opposite direction, the rotation being at reduced speed. While the sprocket 7 is thus rotating and gyrating, each pin 21 follows an orbital path as constrained to do so by the contour of the ovoid hole 41 (within which it is held captive) and also moves within the contour of the recess formed between consecutive teeth 31, engaging point after point of the contour of this recess, the all-important feature being that a very substantial number of gearteeth engage at any given instant with an equal number of ovoid holes (through the interconnecting interengagement of an equal number of pins) and up to one half that number carry and share the load.

This number may vary depending on several parameters that may be present in a specific application, or by design choice. However, engagement through half the cycle (i.e. throughout 180°) has several design advantages, for example it allows disengagement in the remaining half cycle. In this case, while the design objective may be to have load-transmission and sharing throughout 90°, again extraneous parameters inherent in a particular application or, once more, design choices, may limit such load-transmission and sharing in less than a quarter cycle (less than 90°), as, for example, it was just above-described in connection with FIG. 1a. Besides the several other differences and advantages of the present invention over the prior art, the following must be particularly stressed:

STRUCTURALLY the instant invention discloses a novel toothed wheel in which each recess between consecutive teeth 31 is a PORTION OF AN OVOID HOLE (i.e. there is a portion of an ovoid profile formed right on the toothed wheel).

THE OPERATION of such an ovoid-toothed gear is also quite novel in that while according to prior art the meshing elements (i.e. pins) where literally locking with the gearteeth during the engaging part of the cycle, in the instant invention the meshing elements (pins 21) move continuously within the recesses, engaging point after point of the contours of the portions of the ovoid profiles formed between consecutive teeth.

It is important to point out that this continuous moving of the pins 21 within the contours of the ovoid holes 41 on the datum plate 40 and within the ovoid profiles on the sprocket, may be used to great advantage, namely: If the recesses between the teeth 31 are portions of the same ovoid contours of holes 41 and point in opposite directions, then the pins 21 will move in A PURE ROLLING MOTION, that is, they will literally roll within these two contours and the friction losses will be (theoretically) eliminated.

In addition, devices constructed according to the instant invention are much simpler than equivalent ones built according to prior art, and this results in easier manufacture, fewer and simpler components and very substantial reduction of cost. Furthermore they have a higher efficiency, greatly reduced losses and are substantially lighter and smaller in size.

OVOID SHAPE—DEFINITIONS

OVOID PROFILE (or Ovoid Shape) means egg-shaped, i.e. having the profile of an egg (see FIGS. 4 and 5).

Such a profile has two axes, one being longer than the other, i.e. a "Major axis" and a "Minor axis".

THE MAJOR AXIS is the axis of symmetry a-b, which is the longest dimension of the Ovoid Profile, and it intersects the Minor axis c-d at mid-point and at right angle.

The MINOR AXIS c-d is the largest dimension perpendicular to the Major axis.

We shall define as the DESIGN CENTRE of an Ovoid Profile the point of intersection of the Major and Minor axes.

The Major axis intersects the Ovoid Profile at two points, one lying on an arc having the smallest radius of the Ovoid Profile (i.e. at b), and the other lying on a larger radius. We shall define as the Basal end of the Ovoid profile the larger, broader, end intersected by the Major axis.

INTERSECTING PITCH CIRCLES

In conventional gearing it is customary to employ for analysis purposes the concept of "Pitch Circles".

In such conventional gearing, the pitch circles of two engaging gears meet tangentially at one only point, and this accounts for the fact that substantially only one tooth per gear engages and transmits the load at any given time.

It is possible to follow an analogous method of analysis in the instant invention. To do so, it is necessary to define the pitch circle of ovoid holes (or ovoid profiles) as the circle passing through their "Design Centres".

Thus, referring to FIG. 1, the Pitch Circle with centre O of the Ovoid Holes 41 of the base plate 4 is $C_p$ (Pitch Circle Plate or PCP). The Pitch Circle with centre O' of the Ovoid Profiles on the sprocket 7 is $C_s$ (Pitch Circle Sprocket or PCS). The Pitch Circle with centre O'' of the pins 21 is $C_q$ (this is the circle passing through the axes of the pins 21). The circle O'' lies midway between O and O'.

A most unusual, but very important, feature of the instant invention is that all three Pitch Circles $C_p$ $C_s$ and $C_q$ intersect one another at the same two points Z above the axis X'—X.

This intersection of Pitch Circles constitutes a radical departure from accepted concepts concerning gearing devices and may be employed as the basis for analysing torque converters designed and built according to the instant invention. This analysis applies only above the diameter X—X', since below it disengagement occurs to allow the teeth to progress to the following "station", i.e. to advance by one ovoid.

It is important to note that all three Pitch Circles $C_p$ $C_s$ and Cq have the same Pitch P, i.e. the distance between the design centres of the Ovoid Holes 41 is equal to the distance between the design centres of the Ovoid Profiles on the sprocket 7, and is equal again to the distance between the axes of the pins 21. This may not necessarily hold true below the axis X'—X, since the distances between pins 21, when they are not held apart by means such as the side plates 16 and 17, may vary.

DETAILED ANALYSIS

In order to fully realise the potential of the novel features offered by the instant invention, it is essential to carefully investigate, analyse and design the shapes and sizes of the ovoid holes, ovoid profiles and the other parameters of the component parts, of devices according to the present invention. This will be outlined below, insofar as the Ovoid shapes are concerned.

As abovementioned, in conventional gearing, only one (or at best a few) of their teeth mesh and transmit the loads at any given instant.

One way of obtaining multitooth engagement is to make at least one of the two meshing gears flexible and continuously deform their shape. In fact, this is what the "Flexspline" system does, but serious practical problems render it difficult to make and quite expensive.

Another way is that taught by the present invention. But first, it is helpful to forget the conventional concepts of "gears" and "gearteeth". The next step is to consider that in order to transmit loads, it is necessary to have two basic elements, namely:

1. An "action" element (assume it movable or rotatable
2. A "reaction" element (assume it stationary)

In order to transmit loads, these two elements must, somehow, interengage and, therefore, it is necessary to form on them suitably shaped "profiles" (i.e. not necessarily "teeth"). Furthermore, in order to obtain "multi-profile engagement" and since both action and reaction elements are rigid, it becomes evident that the engagement points at consecutive, "profiles" must occur at different locations along their "contours".

Consequently, the profiles on the action and reaction elements will be of such shapes, that these profiles could not possibly interengage directly. The solution is to interpose INTERMEDIARY, INTERCONNECTING ELEMENTS.

Therefore, one more element must be added to the abovementioned two, ending up with three basic elements (versus the two of conventional gearing), i.e.

1. An action element (such as the profiles on sprocket 7)
2. A reaction element (such as holes 41 on base plate 40)
3. Connecting Meshing Elements (such as pins 21)

It is possible to determine the shape of these "profiles" or "holes" in two ways. Experimentally and Theoretically (i.e. by means of mathematical calculations). The latter gives equations based on known parameters and is a useful tool in the design of devices according to the present invention.

THE EXPERIMENTAL DETERMINATION OF A PROFILE LOCUS

The experimental determination of such a profile will be described by reference to FIGS. 3, 4, 4a, 4b, 4c, 4d and 5. FIG. 3 is a "draughting machine" on which the shapes of such "profiles" will be determined and their parameters explored. In this machine disc 40 is the "reaction element" on which the desired profiles will be traced. These profiles will have "design centres" on Pitch Circle $C_p$ (having its centre at O). $C_s$ is the Pitch Circle of the "action element" (having its centre at O'). Pitch Circle $C_s$ is smaller than Pitch Circle $C_p$ and the two circles are displaced from one another by the eccentricity $\epsilon$.

The centres O and O' are "fixed to earth", i.e. they are axes (fixed and stationary) about which $C_p$ (and Disc 40) and $C_s$ may freely rotate, separately and independently from one another. That is, assume $C_p$ and $C_s$ to be discs, or pulleys, freely rotatable about O and O' respectively.

Next, a belt is placed around $C_p$ and another belt around $C_s$ both belts encircling a common idler disc I, the spindle of which is also "fixed to earth", and a stylus is attached at point A on the periphery of $C_s$ (point A being at the greatest overlap between $C_p$ and $C_s$ above axis X'—X).

Figure 4A:
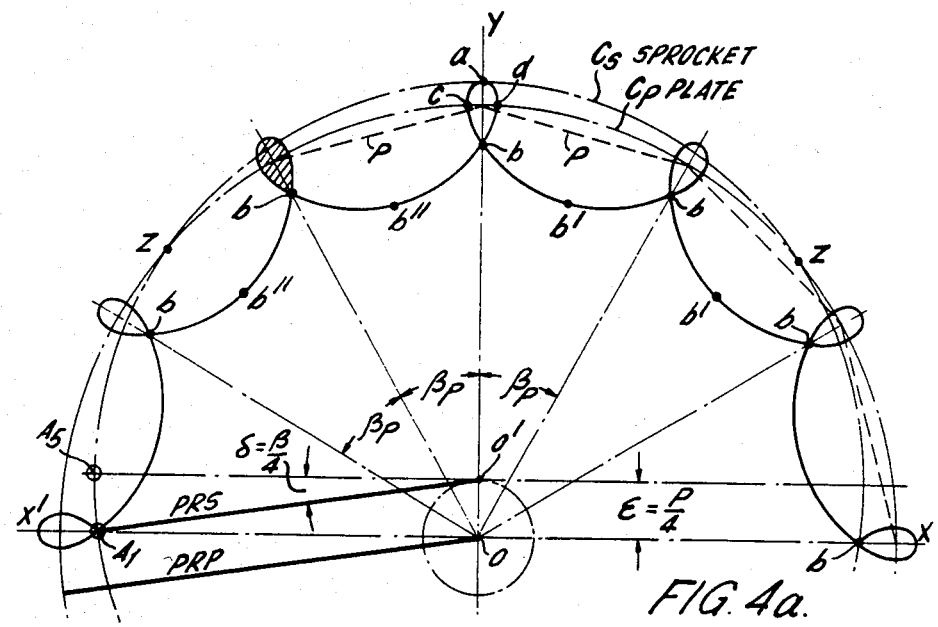
FIGS. 4a, 4b, 4c, 4d are typical traces drawn by the experimental set-up of FIG. 3, with added lines and letters to aid the analysis.
Figure 4B:
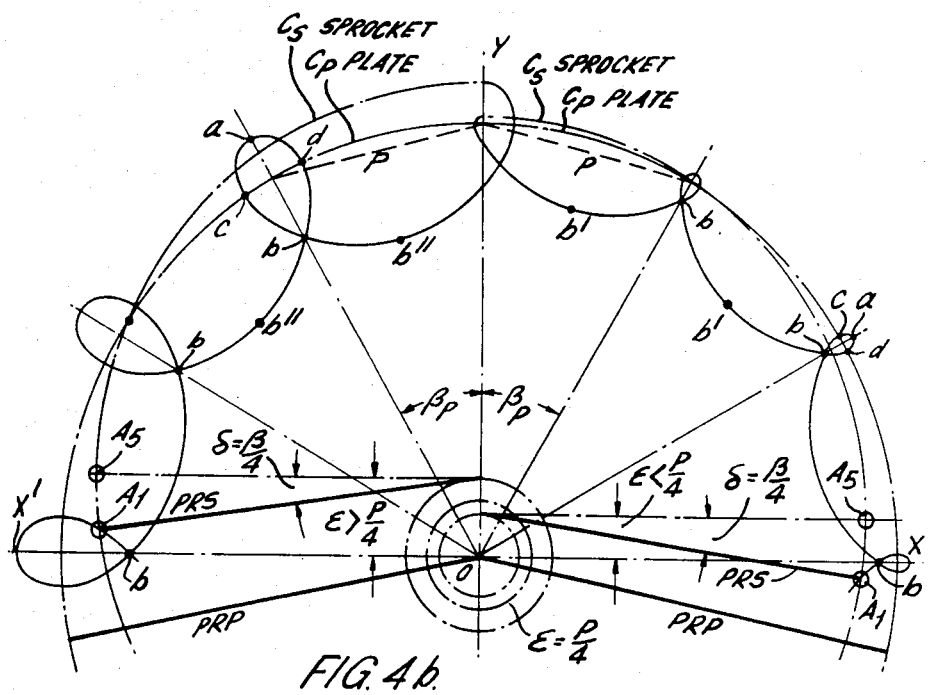
Figure 4C:
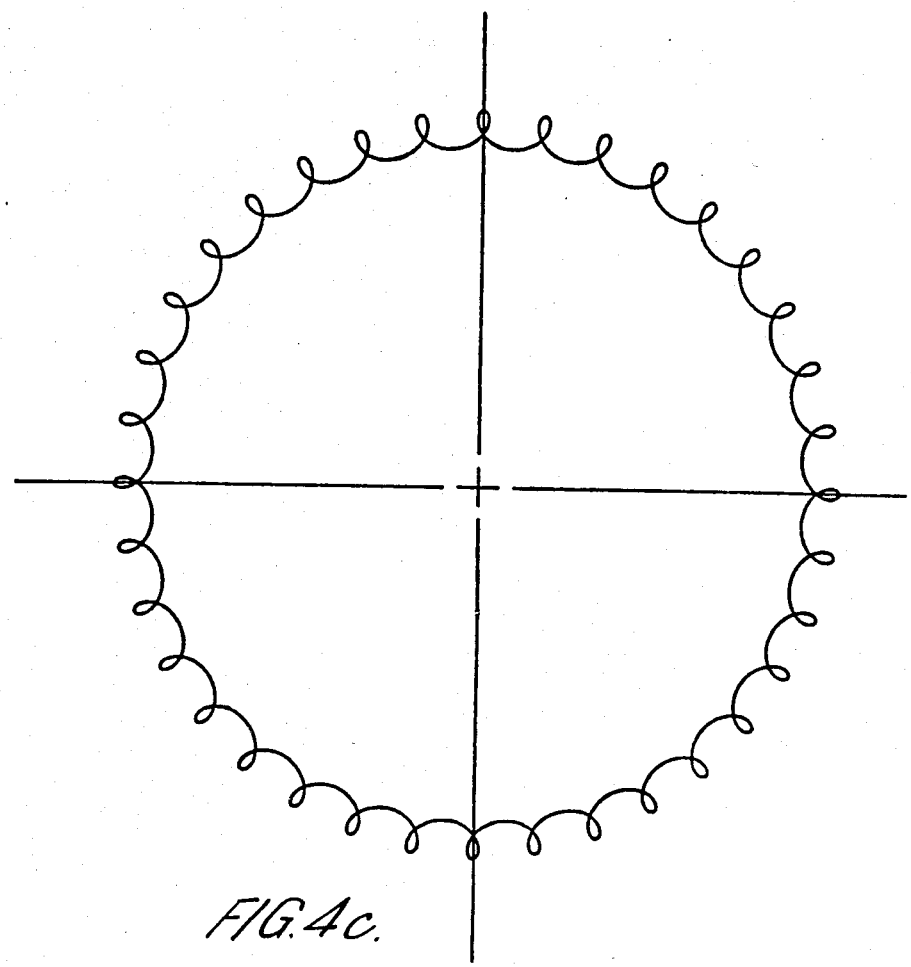

Now if $C_s$ is rotated, the stylus on it will trace on disc 40 curves as shown in FIG. 4a or FIG. 4b or FIG. 4c.

Note that these curves include a number of ovoid shapes, such number depending solely on the ratio of the two radii of $C_p$ and $C_s$ while the size of the ovoid (the Ovoid area shown cross-hatched) depends on the eccentricity $\epsilon$.

That is, angle $\beta_p$ (see FIGS. 4a and 4b) depends on the ratio of the two radii of circles $C_p$ and $C_s$ and, therefore, angle $\beta_p$ is the same in both figures.

However, the eccentricity in FIG. 4a is $\epsilon = P/4$, the eccentricity in the left of FIG. 4b is $\epsilon > P/4$, while that in the right of FIG. 4b is $\epsilon < P/4$. Therefore, the ovoids of FIG. 4b, left and right, are larger and smaller respectively than those of FIG. 4a.

From the "draughting machine" of FIG. 3 we deduct:

1. That the shape of the "profile" we are seeking is an Ovoid Locus, such as that shown enlarged in FIG. 4.

2. That stylus (Connecting Meshing Element, or pin, having a diameter equal to zero) on $C_s$ will engage such an Ovoid on $C_p$ during a selected (design choice) fraction of a full rotation (360°).

3. That if such a stylus on $C_s$ is "withdrawn" during the remaining portion of the abovenoted selected fraction of a full rotation (i.e. during the angle equivalent to the b—b trace), this withdrawal could in practice correspond to a disengagement cycle, during which the stylus, i.e. the meshing connecting element, could "jump over" (i.e. advance by) one, or more, Ovoids, thereby obtaining considerable speed reduction.

4. The several useful relations between $C_p$, $C_s$, $\beta_p$, P and $\epsilon$, including those abovenoted.

5. That the larger the ovoid trace b-c-a-d-b the larger the portion of the cycle through which engagement is possible (design choice).

Figure 4D:
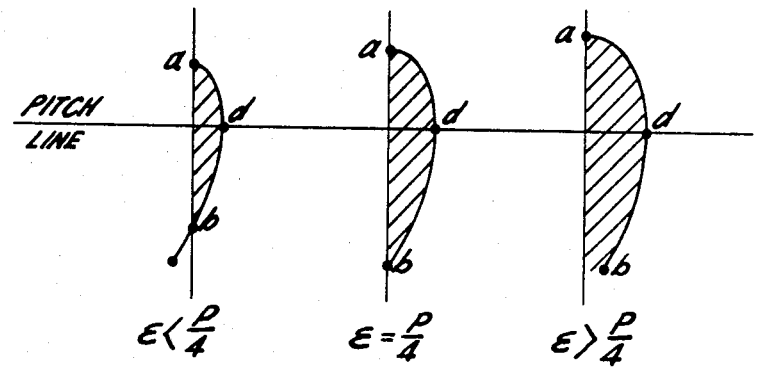

6. Regarding the selection of engagement and disengagement cycles, FIG. 4d is very helpful in that it shows the traces inscribed by the stylus A (see FIG. 3) during a 90° rotation of $C_p$, for various values of eccentricity $\epsilon$. Evidently, when the Ovoid portion is used in the device of the invention, disengagement must occur before 90°, i.e. above the X'—X axis, or at 90°, i.e. on the X'—X axis, respectively for the first two traces, and may occur after 90°, i.e. below the X'—X axis in the case of the third trace. The corresponding conditions to the above occur in FIG. 4b right, FIG. 4a and FIG. 4b left, respectively.

Once the actual diameter of the meshing elements (pins 21) is determined, a series of circles having radii equal to that of the pins 21 are traced with centres right on the trace of FIG. 4, thus arriving at FIG. 5. The envelope of this FIG. 5 is the actual "working profile" when the connector meshing elements (pins 21) have a given diameter and therefore each recess between the teeth is necessarily larger than the pin. FIG. 1 shows that the recesses between the teeth are larger than the pins.

If we form ovoid holes or profiles on the reaction element (datum plate 40) and ovoid profiles on the action element (recesses on the periphery of the action element, i.e. the sprocket 7) and if we wish to have a pure rolling motion of the pins 21, we must exactly halve the size of the ovoid profile shown in FIG. 4, and we must also orient the two profiles (on the datum plate 40 and the sprocket 7) in opposite directions, more precisely, their basal ends must point outwardly, i.e. away from one another.

As previously mentioned, a pure rolling motion of the pins 21, means a (theoretical) elimination of friction, a factor that greatly improves the overall efficiency of the mechanism.

It must be noted that the circles $C_p$ and $C_s$ are coupled to the same idler wheel I and therefore their rotary movement is fully homokinetic, that is, if $C_p$ is rotated at a constant angular velocity, $C_s$ will also move at a constant angular velocity, although these two angular velocities will, of course, be different from one another, since the two circles $C_p$ and $C_s$ have different diameters. This is very important, because the input and output speeds will always be homokinetic, for example, for a constant input speed, there shall always be a constant output speed.

THE THEORETICAL DETERMINATION OF THE OVOID PROFILE

General

All calculations are based on conditions occuring during the engaging two quadrants, i.e. when the sprocket recesses engage with the ovoid holes, through the intermediary action of the meshing elements (above the axis X'—X in FIG. 1).

In order to simplify the analysis, it is easier to consider the input shaft stationary and the torque converter rotatable about this stationary input shaft.

Symbols

P=Common Pitch of Sprocket teeth and Ovoid holes.
PRS=Pitch Radius of Sprocket teeth.
PRP=Pitch Radius of Datum Plate (i.e. of design centres of Ovoid holes).
$\epsilon$=Eccentricity (=O—O')
$\alpha$=Angular rotation of Datum Plate relative to Input Shaft.
$n_s$=Number of teeth on Sprocket.
$n_p$=Number of Ovoid holes on Datum Plate.
K=$n_p-n_s$
R=$n_p/n_s$
$\beta$=Pitch angle of Sprocket tooth.
$\delta=\beta/4$
CP=Capturing Plate (Datum Plate)
S=Sprocket
O=Centre of rotation of Datum Plate (stationary Input Shaft).
O'=Centre of rotation of Sprocket and Output Shaft.

Determination of Eccentricity $\epsilon$

Referring to FIG. 1, it will be noted that the sprocket 7 is rotating about axis O' and that the input shaft 1 is rotating about axis O, which coincides with the pitch circle of the Ovoid holes 41, the eccentricity being $\epsilon$=O—O'.

If there is one tooth less on the sprocket than there are Ovoid holes on the Datum Plate, it is clear that, for one revolution of the input shaft, the sprocket will rotate by an angle equal to the Pitch Angle $\beta$ (of one tooth).

If, however, the input shaft is kept fixed and stationary, for a 360° rotation of the Datum Plate, the sprocket will rotate by 360°+$\beta$ (and in the same direction), i.e. referring to FIG. 6, when the centre of an Ovoid hole B$_0$ rotates 360° and returns to the same position (i.e. at B$_4$), the sprocket A$_0$ has assumed the position A$_4$, and angle A$_0$O'A$_4$=$\beta$, the straight line A$_0$—A$_4$=P being the linear pitch. By the same analogy, for one quarter of one revolution of the Datum Plate (90°), the sprocket rotates 90°+$\beta/4$=90°+$\delta$, i.e. as shown in FIG. 6, when B$_0$ moves to B$_1$, A$_0$ moves to A$_1$, angle A$_5$O'A$_1$ being $$\beta/4 = \delta \quad (1)$$

Therefore, as shown in FIG. 6, when the Datum plate rotates through 90°, 180°, 270°, 360°, a particular centre of an Ovoid hole assumes the positions B$_1$, B$_2$, B$_3$, B$_4$ while the same tooth moves to positions A$_1$, A$_2$, A$_3$, A$_4$.

And in general, for a rotation of PRP by an angle $\alpha$, the equivalent rotation of PRS will be $$R\alpha \left( = \frac{n_p}{n_s} \alpha \right),$$

as shown in FIG. 7.

By the same reasoning and referring to FIG. 6 when, generally, $n_p-n_s=K$, for a 360° rotation of the point A$_0$, i.e. when it returns at the same position B$_4$), point A$_0$ has rotated 360°+K$\beta$ to A$_4$, so that arc A$_0$—A$_4$=K$\beta$. And for ¼ revolution (i.e. 90°) of point B$_0$, to the position B$_1$, point A$_0$ has rotated to A$_1$ on an arc $$\frac{360° + K\beta}{4} = 90° + \frac{K\beta}{4} A_0 - A_1$$

Now referring to what was noted by reference to FIGS. 4a, 4b and 4d, it will be observed that point A$_1$ in FIG. 4a lies on the X'—X axis, in FIG. 4b it lies above and below the X'—X axis in the left and right quadrants respectively, from which it follows that for $\epsilon$<MA$_1$ (FIG. 4b right) disengagement must occur before a full quadrant, while for $\epsilon$>MA$_1$ (FIG. 4b left), disengagement may occur after a full quadrant. Generally though, when point A$_1$ is right on the X'—X axis, i.e. when $\epsilon$=MA$_1$, we may have the symmetrical condition of 180° engagement and 180° disengagement, which obviously has several design advantages.

Therefore, if we elect to have point A$_1$ on the X'—X axis:

$$\epsilon = MA_1 = PRS \sin \frac{K\beta}{4} \quad (2)$$

i.e. the value of $\delta$ see (1) above, is generally $\delta=K\beta/4$
From FIG. 9 we obtain $$PRS = \frac{P/2}{\sin \beta/2} \quad (3)$$

and substituting (3) in (2):

$$\epsilon = MA_1 = \frac{P}{2 \sin \beta/2} \sin \frac{K\beta}{4} \quad (4)$$

For K=1, formula (4) becomes:

$$\epsilon = P \frac{\sin \frac{\beta}{4}}{2 \sin \frac{\beta}{2}} \quad (5)$$

which for N$_s$>9 (i.e. above the range of interest) (5) becomes $$\epsilon = \text{approx. } P/4$$

The approximation is very close. For example, by giving a value of unity to P, the accuracy is:
for $n_s$=9, to within 0.0053
for $n_s$=36, to within 0.00009
for $n_s$=90, completely exact within the accuracy of 5-decimal-place trigonometric tables.
For K=2, formula (4) becomes:

$$\epsilon = \frac{P}{2\sin\beta/2} \sin\frac{2\beta}{4} = \frac{P}{2}$$

It must be noted that small departures from the optimum computed values of $\epsilon$ may be permissible in some cases because $\epsilon$ is a function of $$\frac{\sin\frac{K\beta}{4}}{\sin\beta/2}$$

and $\beta$ is a relative small angle.

FIGS. 4a, 4b and 4d where drawn to illustrate the beginning of the text when, for simplicity, $n_p - n_s$ was assumed to be unity. Therefore, in these Figures, where eccentricity is given as a function of P/4, a more general notation would be to substitute PRS sin $\delta$ in place of P/4, where $\delta = K\beta/4$.

Ovoid Locus

As previously mentioned, the design centres of all Ovoid holes lie on the Pitch Circle $C_p$ and their Major Axes a-b are along the radial sense PRP (see FIGS. 7 and 8).

Therefore, a convenient method for plotting an ovoid profile is to calculate the values of successive lengths BA at, say, 5° increments of angle $\alpha$. Any length BA (see FIG. 8) may conveniently be the resultant of two components, such as a Y ordinate taken along a radius PRP and an X ordinate perpendicular to it, both starting at the design centre B.

As the angle $\alpha$ increases from ZERO at $B_0$ to 90° at $B_1$, the Plate Pitch Circle $C_p$ (arc $B_0B_1$) crosses the Sprocket Pitch Circle $C_s$ (arc $A_0A_1$) at point Z, which cross-over point actually depends to a very small degree on the value of $R = n_p/n_s$ (and, therefore, for all practical purposes Z may be taken as occuring at $\alpha = 52°$).

Accordingly, ordinate Y is zero at $\alpha$ approx. 52°, ordinate X is zero at $\alpha = 0°$ and at $\alpha = 90°$ Referring to FIG. 8, AE and A'E' are X ordinates, while +BE and −B'E' are Y ordinates (depending on which side of the point Z, the Y ordinate is positive or negative).

From the geometry of the quadrilateral AEOO'
angle O'OB = $\alpha$
angle AO'O = 180° − R$\alpha$
angle EAO' = 90° + $\phi$
angle AEO = 90°

From the triangle AO'G angle $AO'G$ = 180° − R$\alpha$ − (90° − $\alpha$)
= 90° − R$\alpha$ + $\alpha$
= 90° − $\alpha(R - 1)$ also, angle AO'G + $\phi$ = 90° and therefore $$\phi = 90° - \text{angle } AO'G \quad (1)$$
$$= 90° - [90° - \alpha(R - 1)]$$
$$= \alpha(R - 1)$$

From triangle O'FO $O'F = \epsilon \sin \alpha$ (2)

$FO = \epsilon \cos \alpha$ (3)

Considering again triangle AO'G and substituting (1):

$$G0' = PRS \sin \phi \quad (4)$$
$$= PRS \sin[\alpha(R - 1)]$$
$$AG = PRS \cos \phi \quad (5)$$
$$= PRS \cos[\alpha(R - 1)]$$
The $X$ ORDINATE = $AE$
= $GF$
= $O'F - G0'$ and substituting (2) and (4):

$X = \epsilon \sin \alpha - PRS \sin[\alpha(R-1)]$ (6)

The value of the Y ordinate will be positive, negative, or zero, depending on the arcs $B_0Z$ (positive), $ZB_1$ (negative) or the point Z (zero).

Thus, for the arc $B_0Z$:

$Y = (EF + FO) - OB$ which will be positive since $EF + FO < OB$ (as it may be seen in FIG. 8)
And for the arc $ZB_1$:

$Y = (E'F + FO) - OB'$ which will be negative since $E'F + FO < OB'$
Therefore, the formula will take care of the positive and negative signs, and the formula, generally, becomes:

$$Y = (EF + FO) - OB$$
$$= (AG + FO) - PRP$$

and substituting (5) and (3):

$Y = PRS[\cos \alpha(R-1)] + \epsilon \cos \alpha - PRP$ (7)

Formulae (6) and (7) provide the locus of Ovoid holes from $\alpha = 0°$ to $\alpha = 90°$, when the diameter of the meshing connector elements (such as the pins 21) is equal to zero. FIG. 10 illustrates how the above formulae (6) and (7) are used to plot the locus of an ovoid profile for values of $\alpha$ increasing by 5°. In this FIG. 10, line 1 is the ovoid locus directly derived from formulae (6) and (7), while line 2 is the ovoid locus when that of line 1 is halved in order to form one ovoid on the Datum Plate and another on the Sprocket.

Once the diameter of the meshing connector elements (pins 21) is determined, we inscribe a series of circles, having a radius equal to that of pin 21, with centres on the locus as above-described, and arrive at the actual shape of the Ovoid, which is the envelope of the circles, i.e. we arrive at the previously described FIG. 5.

Small departures from the theoretically developed Ovoid locus may be desirable in some cases.

Since the linear pitch P is common to the Sprocket and the Base Plate (the plate formed with the Ovoid holes), it is sometimes useful to derive the X and Y ordinates from this value P rather than PRS and PRP.

Referring to FIG. 9, we see that $$\frac{P}{2} = PRS \sin \frac{\beta_s}{2} \quad (8)$$

While the linear pitch P is the same for the sprocket and the Ovoids (base plate), the Pitch Angles will be different. Let us designate:

$\beta_s$ = pitch angle of sprocket
$\beta_p$ = pitch angle of plate (ovoids)

then, $\beta_s = 360°/n_s$ and $\beta_p = 360°/n_p$ and $\beta_s/2 = 180°/n_s$ and $\beta_p/2 = 180°/n_p = 180°/n_s + K$
from (8)

$$PRS = \frac{P}{2\sin\frac{\beta_s}{2}} = \frac{P}{2\sin\frac{180°}{n_s}} \quad (9)$$

likewise, $$PRP = \frac{P}{2\sin\frac{180°}{n_p}} = \frac{P}{2\sin\frac{180°}{n_s + K}} \quad (10)$$

Substituting (9) and (10) in (6) and (7), we obtain:

$$X = \epsilon\sin\alpha - \frac{P}{2\sin\frac{180°}{n_s}}\sin[\alpha(R-1)] \quad (11)$$

$$Y = \frac{P}{2\sin\frac{180°}{n_s}}\cos[\alpha(R-1)] + \epsilon\cos\alpha - \frac{P}{2\sin\frac{180°}{n_s + K}} \quad (12)$$

Note that in many applications $\epsilon$, R and K may be considered to be constants. In fact, it is a design choice to have:

$\epsilon = P/4$ and $K = 1$ in which case, since $K = n_p - n_s = 1$, $n_p = n_s + 1$ and therefore $R = n_p/n_s = (n_s + 1)/n_s$ Thus, the novel Ovoid-toothed gear may be designed for any chosen values of the Pitch P and the number of teeth $n_s$.

MESHING MEANS AS PLANOCENTRIC COUPLINGS

There is an element and novel arrangement according to which the Meshing Means (i.e. the pins 21) may be employed as planocentric coupling means. The considerable advantage of this novel arrangement is that it renders superfluous a separate back-to-centre coupling device.

This arrangement will now be described with reference to FIG. 11 which is a cross sectional view equivalent to that illustrated in FIG. 2. Datum plates 40 and 50 are interconnected by means of spacer 60 and are therefore gyrating as a single unit about eccentric 5, which is firmly secured to input shaft 1, but are prevented from rotating about their axis by the pins 21 which pass through appropriate holes 41' (to be described below) formed on the stationary frame of the mechanism, for example on stationary plates 40' and 50'. The sprocket 7 meshes with the ovoid holes on the datum plates 40 and 50 through the interengaging function of the pins 21, in the manner previously described in connection with the device of FIGS. 1 and 2. However, it will be observed that this sprocket 7 is disposed co-axially with the input shaft 1 and, therefore, while with respect to the datum plates 40 and 50 it rotates eccentrically, with respect to the frame of the device (i.e. with respect to "earth"), it simply rotates co-axially with the input shaft 1. Therefore, the output may be taken very conveniently directly from the sprocket, for example from an output shaft 3 which is firmly and co-axially secured to this sprocket 7.

It also follows that the axis O'—O' rotates about axis O—O, the eccentricity being O—O' = $\epsilon$ and, therefore, the axis of each pin 21 will follow a circular locus of radius equal to $\epsilon$, (or diameter equal to 2$\epsilon$). Accordingly, the holes 41' will have a circular profile having:

Diameter of Hole 41' = Diameter of pin 21 + 2$\epsilon$

Figure 12:
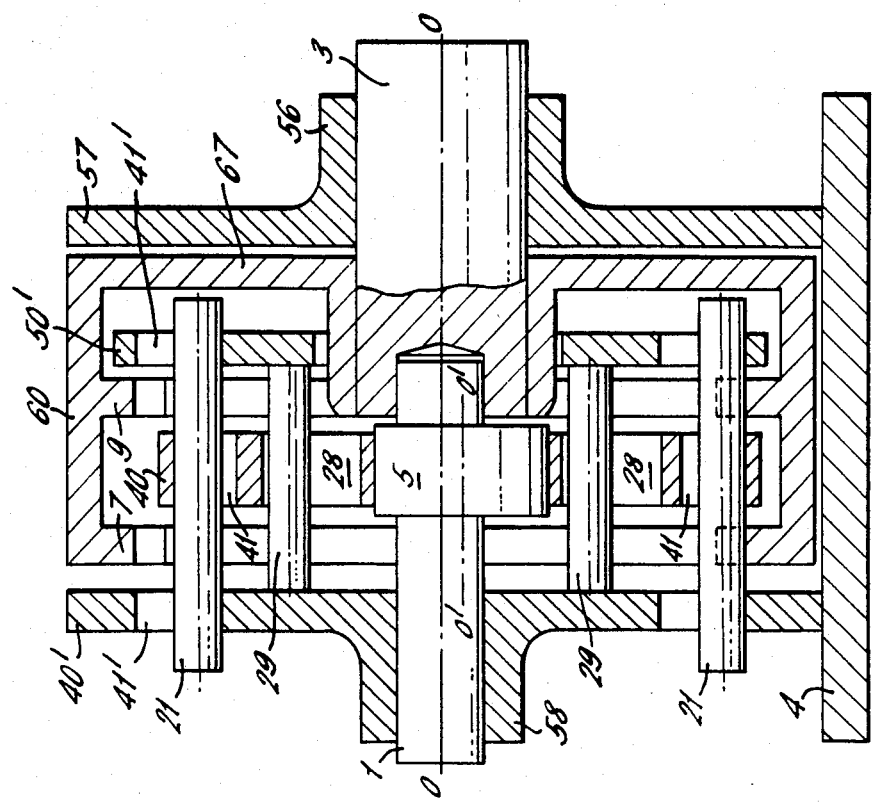
FIGS. 11 and 12 are cross-sectional elevations of other embodiments of the invention.

FIG. 12 illustrates another arrangement in which the meshing means (pins 21) are again employed as planocentric coupling means, but two female gears 7 and 9 provide the output.

Figure 11:
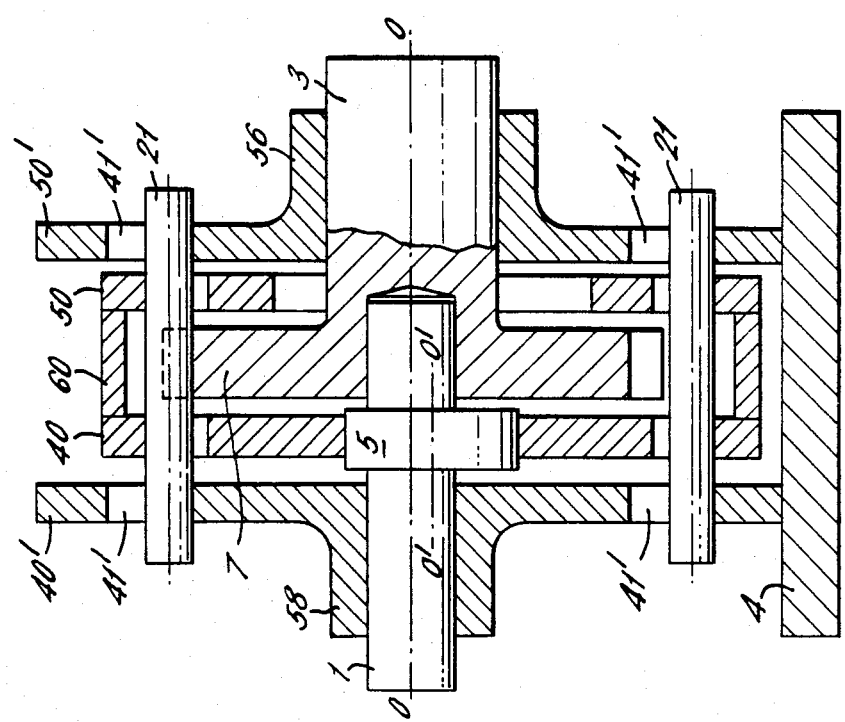

Like the device of FIG. 11, in which the sprocket 7 was gyrating and the output shaft 3 was coupled to the rotating datum plates 40 and 50, here, in the device of FIG. 12, the roles are the same, i.e. the single datum plate 40 is gyrating about eccentric 5 (which is permanently attached to input shaft 1) while the two internal gears 7 and 9, interconnected through cylindrical member 60 and plate 67 to output shaft 3, are rotating at reduced speed.

Again, as in the previously described device, the pins 21 pass through circular holes 41' formed on the stationary plates 40' and 50'. These plates 40' and 50' are secured to one another by means of stand-offs 29 which pass through clearance holes 28 formed on gyrating datum plate 40. Output shaft 3 is bearingly supported in hub or collar 56, which is, in turn, an integral part of support element 57 which is permanently secured to base plate 4.

For the same reasons, as in the previously described case we have:

Diameter of Hole 41' = Diameter of pin 21 + 2$\epsilon$.

DOUBLE PLANOCENTRIC COUPLING

In FIGS. 13 and 14 is shown a device in which the torque converter is essentially similar to that illustrated in FIGS. 1 and 2, as previously described in considerable detail, while the coupling is a novel double planocentric device which brings back to centre the eccentrically rotating output of the first stage.

The first stage includes the input shaft 1 which is formed with an eccentric portion 5 about which are bearingly rotating two fixedly interconnected sprockets 7, while the datum plates 40 and 50 are fixedly supported on the frame 4 of the device. The sprockets 7 and the datum plates 40 and 50 are similar to those previously described in connection with the device of FIGS. 1 and 2, and they interengage through the meshing means (pins 21), as also previously described.

The pair of interconnected sprockets 7 is further fixedly attached to cylindrical member 47 to which, in turn, are fixedly attached two first planocentric discs 36, which are therefore also eccentrically rotating. Between them lies a second planocentric disc 33 which is fixedly secured to output shaft 3, which is coaxially disposed to input shaft 1. Thus, both input and output shafts (and second planocentric disc 33) are rotating about the common axis O—O, while the sprockets 7 and the first planocentric discs 36 eccentrically rotate about their axis O'—O', their eccentricity being the distance O—O'=ϵ

The first planocentric discs 36 and the second planocentric disc 33 have all the same number of holes 37, which have a circular profile. The holes 37 of first planocentric discs 36 and of the second planocentric disc 33 are coupled to one another by means of roller pins 34 which are thus captive within their respective sets of holes.

The centres of all holes 37 on first planocentric discs 36 are equidistantly arranged about axis O'—O', while the centres of all holes 37 on second planocentric disc 33 are equidistantly arranged about axis O—O, the distance between these two axes being the eccentricity ϵ.

The diameter of these holes 37 is given by the formula:

Diameter of Hole 37 = diam. of pin 34 + ϵ.

A counterweight 46 nicely counterbalances the forces caused by the eccentrically rotating masses. This counterweight could be positioned at other locations along the eccentric 5, the most obvious being between the frame and the first sprocket 7, however the location shown in FIG. 13 is a better choice because it is located between the gyrating masses, which makes possible almost perfect dynamic balancing.

It must be pointed out that this novel double planocentric arrangement provides not simply a good Constant Velocity, back-to-centre, coupling means, but a very superior one, in fact, vastly superior to a conventional planocentric arrangement (having a single plate with holes) in that since this novel arrangement makes possible a pure rolling motion of the captive rollers 34 within the holes 37, it reduces friction to a (theoretical) value of zero.

CLOSE-COUPLED, DOUBLE-PLANOCENTRIC, ARRANGEMENT

Figure 15:
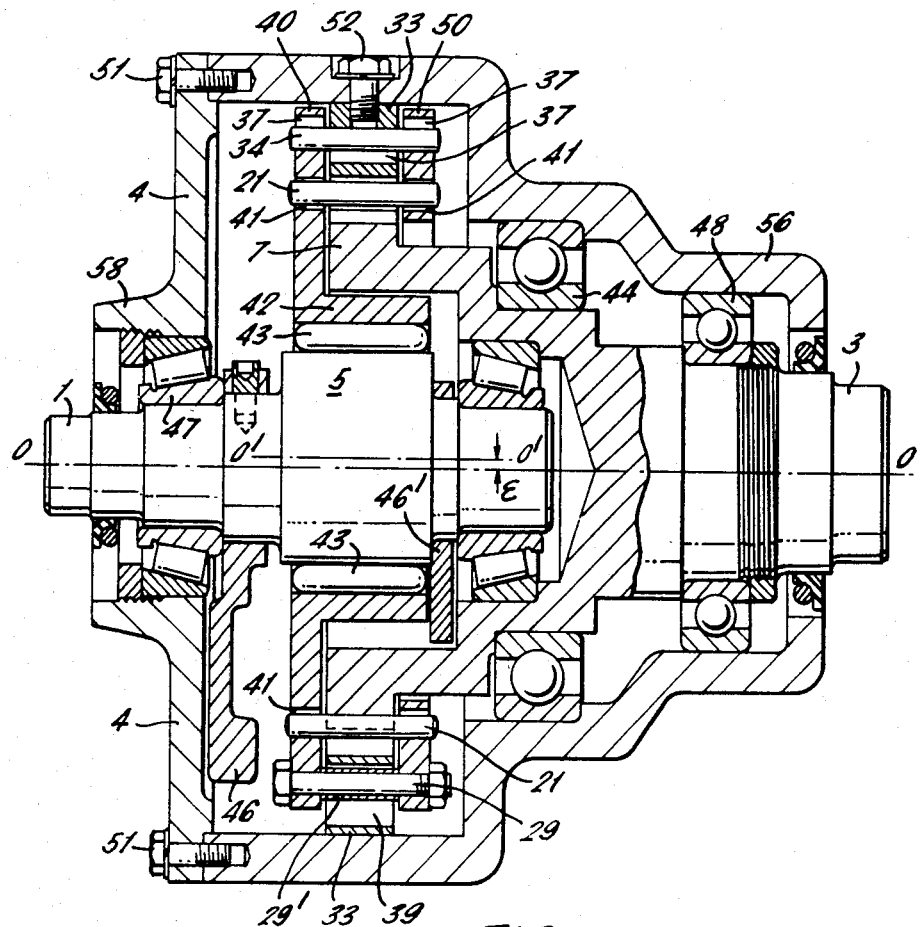
FIG. 15 is a cross-sectional elevation of a particularly interesting, single-stage, planocentric embodiment of the invention.

FIG. 15 illustrates a particularly useful, novel, planocentric arrangment, which does not require a separate coupling. That is, this single-stage torque converter embodiment of the invention includes the novel double-planocentric arrangment previously described in connection with FIGS. 13 and 14. This novel, very compact, arrangement does not require a separate back-to-centre assembly because it has a coaxial disposition of its input and output shafts.

The housing, or casing, may conveniently consist of two parts bolted together, such as flange 4 formed with hub, or collar, 58 within which is bearingly supported for free rotation the input shaft 1, having a longitudinal axis O—O. Input shaft 1 is formed with an eccentric portion 5 having a longitudinal axis O'—O', the eccentricity being Bearingly supported around this eccentric 5 is a couple of Datum plates 40 and 50 formed with ovoid holes 41 interengaging with the recesses between teeth formed on sprocket 7, which is attached to, or forming an integral part of, the output shaft 3, which is in turn coaxially disposed to input shaft 1 and is bearingly supported on the second part 56 of the housing of the device. This second part 56 may be secured to the flange 4 by means of bolts 51, or by any other convenient means. The two Datum plates 40 and 50 may be fixedly attached to one another through any convenient means, for example by means of bolts 29 and stand-offs 29', freely passing through clearance holes 39 formed in ring 33, such holes 39 being sufficiently large to allow the gyratory movement of Datum plates 40 and 50 (to be described below).

The ovoid holes 41, interengage with the recesses on the sprocket 7 through the interconnecting function of pins 21, such ovoids 41, sprocket 7 and pins 21, being substantially as previously described in connection with FIGS. 1 and 2.

But, in addition, datum plates 40 and 50 are formed with a set of circular holes 37, and thus function as first planocentric discs, eccentrically gyrating about eccentric 5, but being prevented from rotating about axis O'—O' by the set of planocentric rollers 34 which also roll within the set of holes arranged on second planocentric (centreless) ring 33. This planocentric arrangement needs no further description because it is similar to that described in connection with FIGS. 13 and 14, but the important distinction is that it forms an integral part of the Datum plates.

It must be noted that to increase the overall compactness of the device, the second planocentric ring 33 and the sprocket 7 are both disposed between the datum plates 40 and 50.

Furthermore, both the input shaft 1 and the output shaft 3 rotate eccentrically with respect to the two datum plates 40 and 50 but, because these two datum plates gyrate eccentrically but are prevented from rotating (by the planocentric arrangement), the input and output shafts are, in effect, coaxial.

The friction losses of pins 21 and rollers 34 are (theoretically) nil, since these pins and rollers move within their respective holes in a pure rolling motion.

Two counterweights 46 and 46' nicely counterbalance the eccentrically moving masses.

The abovedescribed compact, single-stage, speed-changer and double-planocentric device, may be reduced to practice by rearranging the location and varying the shape and size of the components, in an almost endless number of ways and, therefore, the above described device should only be considered as an example of the endless possibilities of the underlying principle.

REDUCED OVOID HOLES

Pins 21 may be conveniently interconnected and held apart at fixed, desired, distances, through any number of means, for example by means of side-plates, such as those designated by numerals 16 and 17 in FIGS. 1 and 2.

But, as already mentioned in the beginning of the description, such interconnection is optional, since the holes 41 may actually provide this feature. However, in those cases where the "tip" of the teeth 31 protrude beyond the radially inward portion of the ovoid holes (in the disengaging portion of the cycle), for example in the situation occurring along the axis OY' of FIG. 1, if the side-plates 16 and 17 (or any other equivalent interconnection) are absent, the pins 21 may foul (i.e. collide with) these tips of the teeth 31, which is a very undesirable possibility since both the tips and the pins may thus be destroyed.

Figures 21, 22:
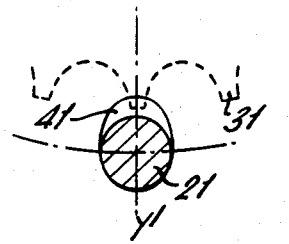
FIGS. 21 and 22 are two different constructions (shapes) of Ovoid Holes, with a diagrammatic illustration of a few gear-teeth according to the invention, during the disengaging portion of the cycle.

In FIG. 21, such a possible condition is illustrated again, while FIG. 22 illustrates a possible remedy, which is to reduce the radially inward portion of the ovoid hole 41 in order to prevent the above-referred to collision. Such a hole 41 will always remain an ovoid hole having a profile derived from the previously described formulae along a substantial part of its contour, except in that portion which has been modified for the abovestated reasons.

ALTERNATIVE ARRANGEMENTS

Because the meshing connector elements (pins 21) are captive within the Ovoids on the datum plate 40 and are constrained to follow an orbital movement of such Ovoids, it is sometimes helpful to refer to the Ovoids on the Datum as the Movement-Limiting Means.

And again, since at the beginning of the description reference to "Profiles" and "Multiprofile Engagement" was made, and since such profiles may be formed on the Sprocket and the Datum Plate, it is sometimes helpful to designate such profiles by numbers, for example, as "First Profiles" meaning the profiles on the Sprocket and "Second Profiles" meaning the profiles on the Datum.

Figure 23:
FIG. 23 is a meshing connector element (pin 21) having a stepped diameter.

It was mentioned in the text that since Ovoids are present on the Sprocket and on the Datum Plate, the size of the Ovoid profile derived from the drafting machine (set up) of FIG. 3, or calculated by the formulae, must be halved. However, it is evident that the two ovoids (one on the Sprocket the other on the Datum) may be of different sizes and in such a case there may be no rolling motion of the pins 21, as long as these pins 21 are of uniform diameter. But, even in this case, it is still possible to maintain substantially rolling motion of the pins 21, of such pins are of stepped diameter (i.e. having first and second coaxial cylindrical portions), such different cylindrical portions engaging corresponding, different-sized, first and second Ovoid Profiles. Such pins may generally be as those illustrated in FIG. 23. And again, even stepped pins may not provide the answer, if their first and second cylindrical portions are not correctly designed.

Datum Plates, such as those designated by numerals 40 and 50 in FIG. 2, have been described as plates, or discs, formed with a series of ovoid holes 41. However for any number of design, or manufacturing, reasons, such plates may be centreless plates or discs, the circumference of the missing centre opening intersecting the ovoid holes at any chosen points. In such a case, the datum plates, or discs, may somewhat resemble an internal gear, such as that illustrated in FIG. 16.

Figure 16:
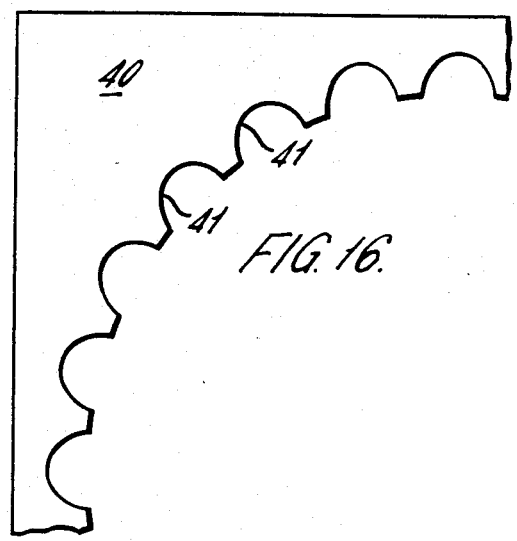
FIG. 16 is a fragment of a modified, alternative, embodiment of a Datum Plate according to the invention.
Figure 17:
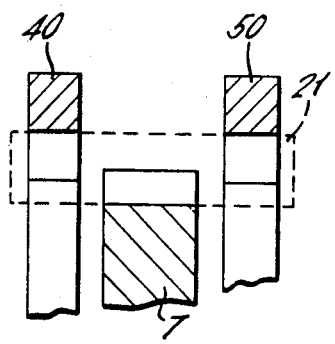
FIGS. 17, 18, 19, 20 are fragmentary sections of component parts according to the invention.
Figure 18:
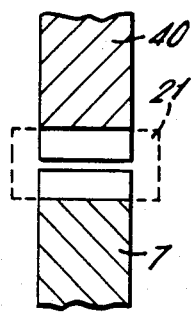
Figure 19:
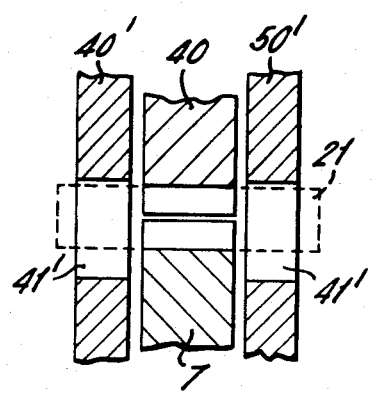

Two such centreless Datum Plates 40 and 50 may sandwich between them a sprocket 7, as shown diagrammatically in FIG. 17 or, as shown again diagrammatically in FIG. 18, the Datum Plate 40 and the sprocket 7 may abut, i.e. be on substantially the same plane. Both FIGS. 17 and 18 are fragmentary sections equivalent to the upper part of FIG. 2 (i.e. along a line OY of FIG. 1). In such cases, since there is only a portion of an ovoid 41 (see FIG. 16), it may be advisable to provide additional pin-capturing means, in order to contain the pins 21 within the desirable, necessary, spatial limits. A convenient means for doing so is to provide additional plates, such as 40' and 50' (see FIG. 19), which may in fact be a part of the casing or housing, formed with circular (or of any other desirable shape) holes 41'. Such holes 41' do not have to go through the entire thickness of the plates 40' and 50', i.e. they need only be cavities formed in such plates. In fact, since the pins 21 need only be contained in the radical sense, i.e. in the general direction of a line passing through the Datum Plates' centre O, distinct cavities are not necessary and a ring-shaped depression formed in such plates 40' and 50' may be sufficient.

Figure 20:
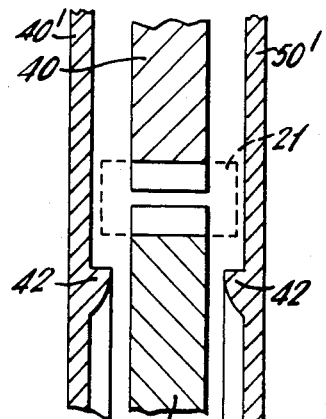

And again, since the portions of the ovoids 41 (FIG. 16) provide the radially outward containment of the pins 21, only a radially inward containment may be sufficient, in which case such containment may be provided through any desired means, for example a suitable depression, or a ledge 42, or a ring-like ledge, or the like, formed in, on, or added to, the plates 40' and 50', for example a ring-like ledge as shown in FIG. 20. Generally, whenever the term hole, such as ovoid hole, is employed in the description, such terms will not only mean a hole, or aperture in the usual sense of the word, but will also include depressions, cavities, notches, cutouts and the like, having the desired profile, or contour, or shape.

Generally, the embodiments of the invention described herein were disclosed as examples for practicing the invention and, therefore, the shapes, sizes, configurations, locations and arrangements of components, parts and assemblies, may vary as desired or dictated by design, or other, considerations.

For example, one, or more, teeth, ovoids, holes, pins and the like, may be altogether omitted, in one, or more, "stations" where such element should be normally present, such omission being dictated by design, or other, considerations.

The term sprocket, gear, or toothed wheel, will include "male" and "female" configurations, for example a male sprocket 7 is shown in FIGS. 1 and 2, in FIG. 11, in FIG. 13 and in FIG. 15, while female sprockets 7 and 9 are shown in FIG. 12.

One, or two, such toothed wheels may be "sandwiched" between Datum Plates 40 and 50, for example, one toothed wheel 7 is employed in the device of FIG. 2, but two parallel to one another wheels 7 could equally well be employed.

Or, alternatively, i.e. by inverting the configuration, one or two Datum Plates (i.e. the plates formed with ovoids) may be "sandwiched" between toothed wheels, for example, one datum plate 40 is sandwiched between two toothed wheels 7 and 9 in the device of FIG. 12, while two datum plates 40 and 50 are sandwiched between two toothed wheels 7 in the device of FIG. 13.

And again, the datum plate (or plates) may be stationary and the toothed wheel rotatable, as shown in FIG. 1, or in inverse arrangement could equally well be employed or, as shown for example in FIGS. 11, 12 and 15, both the plates and the toothed wheels may be movable.

Likewise, the output shaft may be attached to the toothed wheel as shown in FIG. 1, or it may equally well be attached to the datum plate or plates.

The toothed wheel or wheels may be rotatably mounted around the eccentric (as in FIGS. 1 or 13) or the datum plate (or plates) may equally well be rotably mounted on the eccentric (as in FIGS. 12 and 15).

The toothed wheel (or wheels) as well as the datum plate (or plates) may be made in one piece, in more than one piece, or even in laminations.

The meshing connector elements (pins 21) may be optionally interlinked, thus forming an endless transmission loop, such interlinkage being effected by interconnecting them or journalling them, through any desirable means, such as a flexible band or material, or by sideplates, and the like.

Any part, element, or component, described and illustrated as being made in a single piece may, in fact, consist of several assembled pieces. Likewise any such part, element, or component, may not only be of different shape and size, but may also have some portion, or portions, missing altogether, for example as repeatedly mentioned, ovoids may only be portions of ovoid profiles, or a Datum Plate may have its central portion cut-away as shown in FIG. 16.

Generally, the permutations and combinations of components and their shapes, sizes and arrangements, are so many, that it is both unnecessary and impossible to describe and illustrate them, although it is not intended to exclude any such alternatives which fall within the scope of the present invention.

We claim:

1. A motion-transmitting device comprising, eccentric means in the form of a toothed wheel with first profiles constituted by the recesses between adjacent evenly spaced teeth, first movable meshing connector elements, and movement-limiting means in the form of second profiles evenly spaced in a datum member which holds said connector elements in loose captive dependency, each connector element being freely orbital and rotatable in said datum member, wherein the connector elements, when engaged, are each in rolling driving engagement with both the first and second profiles and the rotation of said eccentric means causes said meshing connector elements sequentially to become engaged with and roll around said first profiles and subsequently to become disengaged from said first profiles and wherein said first and second profiles constrain said connector elements, when drivingly engaged with said first and second profiles, to follow when in driving engagement, an orbital motion relative to both said first and second profiles, thereby causing relative gyratory and rotatory motion between the wheel means and datum member, both the second profile and the recesses constituting the said first profiles being sufficiently large relative to said connector elements to permit said orbital motion by rolling of said connector elements around the contours of said first and second profiles while in driving engagement.

2. A motion-transmitting device as claimed in claim 1, wherein a plurality of adjacent ones of said connector elements are simultaneously in driving engagement with a corresponding number of said first and second profiles.

3. A motion-transmitting device as claimed in claim 1, wherein said recess between consecutive teeth has a profile which is substantially a portion of an ovoid.

4. A motion-transmitting device according to claim 3, wherein the periphery of said ovoid is a continuously closed curve which is convex viewed externally and which has a single axis of symmetry which is its major axis and which intersects transversely a single minor axis at the midpoint thereof, which minor axis is the largest dimension of said ovoid perpendicular to said major axis, said curve being asymmetrical about said minor axis.

5. A motion-transmitting device according to claim 4, wherein said major axis passes through the axis of said toothed wheel.

6. A motion-transmitting device according to claim 5, wherein said ovoid is derived from the locus of points having X and Y ordinates obtained substantially from the following formulae:

$$X = \sin\epsilon - \alpha \frac{P}{2\sin\frac{180°}{n_s}} \sin[\alpha(R-1)]$$

$$Y = \frac{P}{2\sin\frac{180°}{n_s}} \cos[\alpha(R-1)] + \epsilon\cos\alpha - \frac{P}{2\sin\frac{180°}{n_s + K}}$$

said Y ordinates being on said major axis and said Y ordinates being on said minor axis, the origin of said ordinates being the design centre of said ovoid and P being the common pitch between successive teeth
$n_s$ being the number of teeth
$\alpha$ being a range of arbitrary values in degrees
$\epsilon$ R and K being design constants.

7. A motion-transmitting device according to claim 6, wherein the shape of said ovoid is the envelope of an infinite number of circles of the same radius inscribed with centres along said locus.

8. A motion-transmitting device according to claim 1, wherein said wheel is a male wheel.

9. A motion-transmitting device according to claim 1, wherein said wheel is a female wheel.

10. A motion-transmitting device including a toothed wheel according to claim 5, wherein said portions are engaging with a series of equidistant, successive, engaging means disposed on a datum member, equidistantly arranged about a centre on said datum member, said axis and centre being rotatable with respect to one another while always at a fixed distance $\epsilon$ apart, said engagement being effected through the interconnecting interaction of meshing connector means.

11. A motion-transmitting device according to claim 1, wherein each of said meshing connector means is cylindrical in shape with its cylindrical surface arranged for rolling in contact with said portions of said first profiles constituting the recesses between successive teeth.

12. A motion-transmitting device according to claim 11, wherein said cylindrical surface is freely rotatable about its own axis thereby enabling said meshing connector means to be in substantially rolling engagement and therefore in substantially frictionless engagement.

13. A motion-transmitting device according to claim 10, wherein said second profiles are substantially part-ovoid profiles, their design centres being equidistantly arranged about said centre on said datum member, and their major axis passing through said centre.

14. A motion-transmitting device according to claim 13, wherein each of said second profiles is only a portion of a full ovoid.

15. A motion-transmitting device according to claim 13, wherein each of said meshing connector means is cylindrical in shape, its cylindrical surface smoothly moving in contact with said ovoids on said wheel and on said datum member.

16. A motion-transmitting device according to claim 15, wherein said cylindrical surface may freely rotate about its own axis thereby enabling said meshing connector means to be in substantially rolling engagement and therefore in substantially frictionless engagement.

17. A motion-transmitting device according to claim 13, wherein said ovoids on said wheel and on said datum are of substantially the same shape and size, and any pair of said ovoids when interconnected by said meshing connector means have their basal ends pointing in opposite directions outwardly with respect to one another, thereby enabling said cylindrical surface to be in substantially rolling engagement and therefore substantially frictionless engagement and thereby obtaining homokinetic motion.

18. A device according to claim 11, wherein adjacent said connector means are flexibly interconnected to one another to form an endless flexible member.

19. A device according to claim 11, wherein adjacent said connector means are flexibly interlinked to one another.

20. A device according to claim 6 and wherein each of the meshing connector elements is cylindrical in shape with its cylindrical surface arranged for rolling in contact with said portions of said first profiles constituting the recesses between successive teeth and wherein adjacent connector means are hingedly interlinked to one another.

21. A motion-transmitting device according to claim 13, wherein the distance between any two successive said design centres is equal to the pitch of any two successive said teeth.

22. A motion-transmitting device according to claim 10, wherein said fixed distance $\epsilon$ is a sub-multiple of the pitch of any two successive said teeth and wherein there is a difference of unity between the number of said design centres and the number of teeth.

23. A motion-transmitting device according to claim 13, wherein there is a difference of at least unity between the number of said design centres and the number of said teeth.

24. A motion-transmitting device according to claim 11, wherein each of said first profiles is the envelope of an infinite number of circles of the same radius inscribed with centres along said locus, said radius being the radius of said cylindrical shape.

25. A motion-transmitting device according to claim 10, wherein eccentric means having an eccentricity equal to said distance $\epsilon$, wherein said eccentric means is disposed to cause each of said meshing connector means sequentially and independently to gyrate in and out of engagement with said engaging means on said datum and with successive said recesses on said wheel, each of said engaging means always guiding in captive dependency the same individual meshing connector means within specific limits of gyratory motion.

26. A motion-transmitting device according to claim 25, wherein said gyratory motion follows a substantially ovoidal trajectory.

27. A motion-transmitting device according to claim 13, including eccentric means having an eccentricity equal to said distance $\epsilon$, wherein said eccentric means is disposed to cause each of said meshing connector means to gyrate sequentially and independently in and out of engagement with said ovoids on said datum and with successive said ovoids on said wheel, each of said ovoids on said datum guiding in captive dependency always the same individual meshing connector means within specific limits of gyratory motion.

28. A motion-transmitting device according to claim 27, wherein the trajectory of said gyratory motion during said engagement is substantially dependent on the shape of the profiles of said ovoids on said wheel and on said dtum.

29. A motion-transmitting device according to claim 13, including eccentric means having an eccentricity equal to said distance $\epsilon$, wherein said eccentric means is disposed to cause said wheel and said datum to rotate eccentrically with respect to one another thereby at least one of said meshing connector means drivingly interconnects one after the other said ovoids on said datum and said ovoids on said wheel by smoothly moving along substantial portions of the peripheries of said two ovoids, each of said meshing connector means being held in captive dependency always be the same ovoid on said datum.

30. A motion-transmitting device according to claim 1, including eccentric means having an eccentricity equal to said distance $\epsilon$, wherein one of four integers being said eccentric means, said wheel, said datum and said meshing connector means, provides a rotational input and one of the other integers provides a rotational output.

31. A motion-transmitting device according to claim 30, wherein a third integer being one of the remaining two other integers is caused by said eccentric means to gyrate eccentrically, while axial rotation preventing means prevents that third integer to rotate axially.

32. A motion-transmitting device according to claim 31, including a stator member and said stator and eccentrically gyrating third integer are two parts which carry between them said axial rotation preventing means.

33. A motion-transmitting device according to claim 32, wherein said axial rotation preventing means include a first circular aperture defined in one of said two parts and a second circular aperture defined in one other of said two parts and a second circular aperture defined in the other of said two parts and a captive roller interengaging said first and second apertures, said two apertures being large enough to allow said eccentric gyration of said eccentrically gyrating third integer.

34. A motion-transmitting device according to claim 30, including an independent output member coaxially rotating with said input but independently therefrom, wherein said other integer is caused by said eccentric means to rotate eccentrically, said independent output member and said other integer being two parts which carry between them axial rotation restoring means, such axial rotation restoring means including a first circular aperture defined in one of said two parts and a second circular aperture defined in the other of said two parts and a captive roller interengaging said first and second apertures, said two apertures being large enough to allow said eccentric rotation of said other integer.

35. A motion-transmitting device according to claim 32, wherein said stator means and said other integer which provides said rotational output, substantially abut.

36. A motion-transmitting device according to claim 33, wherein said stator member and said other integer which provides said rotational output, substantially abut.

37. A motion-transmitting device according to claim 32, wherein one of two components being said stator member and said other integer which provides said rotational output, is disposed around the other.

38. A motion-transmitting device according to claim 33, wherein one of two components being said stator member and said other integer which provides said rotational output, is disposed around the other.

39. A motion-transmitting device according to claim 13, wherein said ovoids on said datum and said ovoids on said wheel are of different sizes and wherein said cylindrical surface is of stepped diameter, with differing diameter portions engaging said different sized ovoids.

40. A motion-transmitting device including eccentric means in the form of a toothed wheel with first profiles constituted by the recesses between adjacent evenly spaced teeth, said recesses being shaped to drivingly engage with independently movable meshing connector elements, and movement-limiting means in the form of second profiles incorporated in a datum member which holds said connector elements in loose captive dependency, the connector elements being freely orbital and rotatable in said second profiles, wherein the rotation of said eccentric means causes said meshing connector elements sequentially to become engaged with and roll around said first profiles and subsequently to become disengaged from said first profiles, and, while engaged with said first profiles, a plurality of adjacent ones of said connector elements are simultaneously in driving engagement with a corresponding number of said first and second profiles, such that said first and second profiles constrain said drivingly-engaged connector elements to follow, when in driving engagement, an orbital motion relative to both said first and second profiles thereby causing relative gyratory and rotatory motion between the wheel means and datum member, both the second profile and the recesses constituting the said first profiles being sufficiently large relative to said connector elements to permit said orbital motion by rolling of said connector elements around the contours of said first and second profiles while in driving engagement therewith.

41. A motion-transmitting device including eccentric means having a wheel with concave recesses which constitutes said first profiles, the design centres of the first profiles being located on a first circle about a first axis, said first profiles providing rolling driving engagement with cylindrical portions on the independently-movable meshing connector elements, and movement-limiting means in the form of second profiles incorporated in a datum member which hold said connector elements in loose captive dependency, said second profiles having design centres located on a second circle about a second axis, said second profiles providing rolling driving engagement with said cylindrical portions, the rotation of said eccentric means causing said connector elements sequentially to become engaged with and roll around said first profiles and subsequently to become disengaged from said first profiles of said wheel means, and while engaged with said first profiles, a plurality of said adjacent ones of said connector elements are simultaneously in rolling driving engagement with a corresponding number of said first profiles and said second profiles, the axis of the connector elements that are in rolling driving engagement being located on the arc of a third circle about a third axis, said first, second and third circles all intersecting one another at the same two points, said first and second profiles constraining said connector elements that are in rolling driving engagement to follow, when in driving engagement, an orbital motion relative to both said first and second profiles, thereby causing relative gyratory and rotatory motion between the wheel means and datum member, both the second profile and the recesses constituting the said first profiles being sufficiently large relative to said connector elements to permit said orbital motion by rolling of said connector elements around the contours of said first and second profiles while in driving engagement therewith.

42. A device according to claim 40, wherein said meshing connector elements are formed with coaxial first and second cylindrical portions, said first profiles engaging said first cylindrical portions and said second profiles engaging said second cylindrical portions.

43. A device according to claim 40, wherein said first profiles have first design centres located on a first circle about a first axis, said second profiles have second design centres located on a second circle about a second axis, said meshing connector elements are cylindrical in shape their longitudinal axis being located on a third circle about a third axis, said first, second and third circles all intersecting one another at the same two points.

44. A device according to claim 43, wherein the distance between two adjacent said first design centres, two adjacent said second design centres and two adjacent said longitudinal axes of said connector elements that are in driving engagement, are all equal.

45. A device according to claim 40, wherein there is a difference of at least unity between the number of first and the number of second profiles.

46. A motion-transmitting device according to claim 42, wherein said first and second cylindrical portions are of the same diameter.

47. A motion-transmitting device according to claim 42, wherein said first and second cylindrical portions have different diameters engaging said first and said second profiles of different sizes respectively.

48. A motion-transmitting device according to claim 40, wherein said connector elements are journalled into an endless transmission loop of flexible material.

49. A device according to claim 40, wherein said first and said second profiles are both portions of an ovoid form.

50. A device according to claim 49, wherein at least one of said portions is a full portion.

51. A motion-transmitting device according to claim 40, wherein said first profiles are portions of an ovoid profile and wherein said second profiles are complete ovoid holes.

52. A motion-transmitting device according to claim 40, wherein at least one of said first and second profiles is an open loop.

53. A motion-transmitting device according to claim 40, wherein both said first and second profiles are open loops, each of part ovoidal form such that said first profiles on said wheel means and said second profiles on said datum member are substantially in the same plane.

54. A motion-transmitting device according to claim 40, wherein both said first and second profiles are open loops, each of part ovoidal profile, such that said wheel means and datum member substantially abut.

55. A device according to claim 40, wherein both said first and second profiles are open loops, each of part ovoidal form such that one of two parts being said wheel means and said datum member is disposed around the other and therefore these two parts substantially abut.

56. A device according to claim 40, wherein at least one station normally occupied by said first profiles, said second profiles and said meshing connector elements is omitted.

57. A device according to claim 11, wherein a meshing connector element is missing at least one station.

58. A device according to claim 11, wherein one of said integers being said eccentric means, said wheel means, said datum member and said meshing connector elements, provides a rotational input and one of the other integers provides a rotational output.

59. A device according to claim 58, wherein said rotational input and said rotational output rotate homokinetically.

60. A device according to claim 49, wherein both said ovoids, being said first and second profiles, are of substantially the same shape and size, and any pair of said ovoids when interconnected by said meshing connector means have their basal ends pointing in opposite directions outwardly with respect to one another thereby enabling said cylindrical surface to be in substantially rolling engagement and therefore substantially frictionless engagement and thereby obtaining homokinetic motion.

61. A motion-transmitting device according to claim 13, wherein each of said ovoids of said wheel and said datum is derived from the locus of points having X and Y ordinates obtained from the following formulae:

$$X = \epsilon \sin\alpha - \frac{P}{2\sin\frac{180°}{n_s}} \sin[\alpha(R-1)]$$

$$Y = \frac{P}{2\sin\frac{180°}{n_s}} \cos[\alpha(R-1)] + \epsilon\cos\alpha - \frac{P}{2\sin\frac{180°}{n_s+K}}$$

said Y ordinates being on said major axis and said X ordinates being on said minor axis, the origin of said ordinates being the design centre of said ovoid and
  P is the common distance between successive design centres of ovoids on the datum and wheel
  $\epsilon$ is said eccentricity
  $\alpha$ is a range of angles in degrees
  $n_s$ is number of ovoids on sprocket
  $n_p$ is number of ovoids on datum
  $K = n_p - n_s$
  $R = n_p/n_s$ 62. A motion-transmitting device according to claim 13, wherein each of said ovoids of said wheel and said datum is derived from the locus of points having X and Y ordinates obtained from the following formulae:

$$X = \epsilon \sin\alpha - PRS \sin[\alpha(R-1)]$$

$$Y = PRS[\cos\alpha(R-1)] + \epsilon \cos\alpha - PRP$$

said Y ordinates being on said major axis and said X ordinates being on said minor axis, the origin of said ordinates being the design centre of said ovoid and
  PRS being the pitch radius of said toothed wheel, that is the distance of any of said design centres of said ovoids on said wheel from said axis
  PRS being the pitch radius of said datum, that is the distance of any of said design centres of said ovoids on said datum from said centre of said datum
  R being the ratio of the number of said ovoids on said datum to the number of said teeth
  $\alpha$ being a range of angles in degrees
  $\epsilon$ being said eccentricity.

63. A motion-transmitting device as claimed in claim 1, wherein said eccentric means is disposed to cause each of said meshing connector elements sequentially and independently to gyrate in and out of engagement with said second profiles on said datum member and with successive said first profiles on said wheel, each of said second profiles always guiding in captive dependency the same individual meshing connector means within specific limits of gyratory motion.

64. A motion-transmitting device as claimed in claim 1 or claim 40 or claim 41 or claim 63, wherein said first profiles are concave recesses between teeth on a male toothed wheel constituting said wheel means and wherein said second profiles are concave recesses in a female surface of said datum member, which datum member surrounds said male wheel.

65. A motion-transmitting device as claimed in claim 1 or claim 40 or claim 41 or claim 63, wherein said wheel means and said datum member overlap in the axial direction.

66. A motion-transmitting device as claimed in claim 65, wherein the wheel means is within the datum member.

67. A motion-transmitting device as claimed in claim 1, wherein said second profiles comprise a series of equidistant, successive, engaging means disposed of a datum member, equidistantly arranged about a centre on said datum member, the axis of said wheel means and said centre being rotatable with respect to one another while always at a fixed distance apart, the engagement between said portions of said first profiles and said engaging means being effected through the interconnecting interaction of said meshing connector elements.

68. A motion-transmitting device as claimed in claim 1, wherein each of said meshing connector elements is cylindrical in shape with its cylindrical surface arranged for rolling in contact with said portions of said first profiles constituting the recesses between successive teeth.

69. A motion-transmitting device as claimed in claim 1 or claim 40 or claim 41 or claim 63, wherein said wheel means and said datum member are in substantially the same plane with the wheel means within the datum member and wherein additional capturing means for the connector are formed in a casing or housing around the datum member.

70. A motion-transmitting device as claimed in claim 69, wherein said additional capturing means for the connector elements comprise a ring-like ledge or depression.

71. A motion-transmitting apparatus as claimed in claim 70, wherein the connector elements are rollers.

72. A motion-transmitting device as claimed in claim 1, wherein the wheel means is sandwiched between two datum plates constituting said datum member.

73. A motion-transmitting device comprising, in combination, eccentric means in the form of a toothed wheel with first profiles constituted by the recesses between adjacent evenly spaced teeth, the design centres of the first profiles being located on a first circle about a first axis, said first profiles providing rolling driving engagement with first cylindrical portions of independently-movable meshing connector elements having cylindrical portions and movement-limiting means in the form of second profiles incorporated in a datum member which hold said connector elements in loose captive dependency, said second profiles having design centres located on a second circle about a second axis, said second profiles providing rolling driving engagement with an aforesaid cylindrical portion, the rotation of said eccentric means causing said connector elements sequentially to become engaged with said first profiles and subsequently to become disengaged from said first profiles of said wheel means, and while engaged with said first profiles, a plurality of said adjacent ones of said connector element with a corresponding number of said first profiles and said second profiles, said first and second circles intersecting one another, said first and second profiles constraining said connector elements that are in rolling driving engagement to follow, when in driving engagement, an orbital motion relative to both said first and second profiles, thereby causing relative gyratory and rotatory motion between the wheel means and datum member, both the second profile and the recesses constituting the said first profiles being sufficiently large relative to said connector elements to permit said orbital motion by rolling of said connector elements around the contours of said first and second profiles while in driving engagement therewith.

74. A motion-transmitting device as claimed in claim 1, wherein said wheel means and said datum member are non-coplanar and wherein said second profiles are closed loops.

75. A motion-transmitting device as claimed in claim 1, wherein said wheel means lies within the datum member and wherein said second profiles are recesses.

76. A motion-transmitting device as claimed in claim 1 or claim 40 or claim 73, wherein said datum member and said wheel means are substantially coplanar.

77. A motion-transmitting device as claimed in claim 1, wherein said first and second profiles are concave recesses and each of said meshing connector means is cylindrical in shape, its cylindrical surface smoothly rolling in contact with said concave recesses in said wheel and on said datum member.

78. A motion-transmitting device as claimed in claim 2, wherein said first and second profiles are concave recesses and each of said meshing connector means is cylindrical in shape, its cylindrical surface smoothly rolling in contact with said concave recesses in said wheel and on said datum member.

79. A motion-transmitting device comprising, in combination, eccentric means having a wheel with concave recesses which constitutes said first profiles, the design centres of the first profiles being located on a first circle about a first axis, said first profiles providing rolling driving engagement with first cylindrical portions on the independently-movable meshing connector elements, and movement-limiting means in the form of second concave recesses which constitutes said second profiles incorporated in a datum member which holds said connector elements in loose captive dependency, said second profiles having design centres located on a second circle about a second axis, said second profiles providing rolling driving engagement with an aforesaid cylindrical portion, the rotation of said eccentric means causing said connector elements sequentially to become engaged with said first profiles and subsequently to become disengaged from said first profiles of said wheel means, and while engaged with said first profiles, a plurality of said adjacent ones of said connector elements are simultaneously in rolling driving engagement with a corresponding number of said first profiles and said second profiles, said first and second circles intersecting one another, said first and second profiles constraining said connector elements that are in rolling driving engagement to follow an orbital motion relative to both said first and second profiles.

80. A motion-transmitting device according to claim 61, wherein side plates hingedly interconnect adjacent said meshing connector elements, thereby ensuring that said connector elements are kept at fixed distances apart from one another and disengage and re-engage said first profiles under controlled conditions.

81. A motion-transmitting device according to claim 62, wherein side plates hingedly interconnect adjacent said meshing connector elements, thereby ensuring that said connector elements are kept at fixed distance apart from one another and disengage and re-engage said first profiles under controlled conditions.

* * * * *